(12) United States Patent
Kumar et al.

(10) Patent No.: US 12,523,915 B2
(45) Date of Patent: Jan. 13, 2026

(54) SUPER ISING EMULATOR WITH MULTI-BODY INTERACTIONS AND ALL-TO-ALL CONNECTIONS

(71) Applicant: THE TRUSTEES OF THE STEVENS INSTITUTE OF TECHNOLOGY, Hoboken, NJ (US)

(72) Inventors: Santosh Kumar, Jersey City, NJ (US); He Zhang, Hoboken, NJ (US); Yuping Huang, Norwood, NJ (US); Ting Bu, Jersey City, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 629 days.

(21) Appl. No.: 17/924,638

(22) PCT Filed: May 13, 2021

(86) PCT No.: PCT/US2021/032338
§ 371 (c)(1),
(2) Date: Nov. 10, 2022

(87) PCT Pub. No.: WO2021/231794
PCT Pub. Date: Nov. 18, 2021

(65) Prior Publication Data
US 2023/0185160 A1    Jun. 15, 2023

Related U.S. Application Data

(60) Provisional application No. 63/024,257, filed on May 13, 2020.

(51) Int. Cl.
*G02F 1/37* (2006.01)
*G02F 1/355* (2006.01)
(Continued)

(52) U.S. Cl.
CPC .............. *G02F 1/37* (2013.01); *G02F 1/3551* (2013.01); *G02F 1/3558* (2013.01); *G02F 1/392* (2021.01); *G06E 1/02* (2013.01); *G02F 2202/20* (2013.01)

(58) Field of Classification Search
CPC ........ G02F 1/37; G02F 1/3551; G02F 1/3558; G02F 1/392; G02F 2202/20;
(Continued)

(56) References Cited

U.S. PATENT DOCUMENTS 5,850,285 A    12/1998   Hill et al.
6,480,265 B2   11/2002   Maimon et al.
(Continued)

FOREIGN PATENT DOCUMENTS

CN    107070651 A1    11/2006
CN    202048988 U     11/2011
(Continued)

OTHER PUBLICATIONS

Notice of Reasons for Rejection, Japanese Patent Application No. 2022-569453, Jan. 28, 2025, 5 pages.
(Continued)

*Primary Examiner* — Collin X Beatty
(74) *Attorney, Agent, or Firm* — Clark Hill PLC; Ralph W. Selitto; John K. Kim

(57) ABSTRACT

An optical computation system includes a light source configured to produce a pump beam, an optical modulator configured to modulate the pump beam based on the modulation mask to generate a modulated beam, a non-linear medium configured to convert a portion of the modulated beam to a second harmonic (SH) beam and to produce an output including the SH beam and an unconverted portion of the pump beam, and a dichroic mirror configured to receive the output of the non-linear medium and to decouple the SH
(Continued)

beam and the unconverted portion of the pump beam, a detector configured to detect a first optical power of the unconverted portion of the pump beam and to detect a second optical power of the SH beam, and a controller configured to generate an updated modulation mask based on the first and second optical powers for transmission to the optical modulator.

8 Claims, 19 Drawing Sheets

(51) Int. Cl.
G02F 1/39 (2006.01)
G06E 1/02 (2006.01)

(58) Field of Classification Search
CPC ..... G02F 1/0102; G02F 2203/12; G06E 1/02; G06N 5/01; G06N 7/01; G02B 27/141
See application file for complete search history.

(56) References Cited

U.S. PATENT DOCUMENTS

| | | | |
|---|---|---|---|
| 6,483,592 | B2 | 11/2002 | Pedigo |
| 7,567,596 | B2 | 7/2009 | Dantus et al. |
| 8,072,609 | B1 | 12/2011 | Trivedi et al. |
| 8,309,929 | B2 | 11/2012 | Bond et al. |
| 8,339,581 | B2 | 12/2012 | Guha et al. |
| 8,621,931 | B2 | 1/2014 | Phua et al. |
| 8,665,923 | B2 | 3/2014 | Sprangle et al. |
| 8,761,606 | B2 | 6/2014 | Habif |
| 9,596,421 | B1 | 3/2017 | Itzler |
| 9,696,133 | B2 | 7/2017 | Yuan et al. |
| 9,945,948 | B2 | 4/2018 | Yang et al. |
| 10,860,746 | B2 | 12/2020 | Foster et al. |
| 11,003,046 | B2 | 5/2021 | Liscidini |
| 11,264,775 | B2 | 3/2022 | Huang |
| 11,442,697 | B2 | 9/2022 | Huang et al. |
| 2002/0097962 | A1 | 7/2002 | Yoshimura et al. |
| 2004/0136634 | A1 | 7/2004 | Chowdhury et al. |
| 2005/0123242 | A1 | 6/2005 | Walker |
| 2006/0083379 | A1 | 4/2006 | Brookner |
| 2006/0245680 | A1 | 11/2006 | Rasmussen et al. |
| 2008/0138087 | A1 | 6/2008 | Snyder |
| 2009/0046296 | A1 | 2/2009 | Kilpatrick et al. |
| 2010/0124787 | A1 | 5/2010 | Nitkowski et al. |
| 2013/0036145 | A1 | 2/2013 | Pruneri |
| 2014/0098955 | A1 | 4/2014 | Hughes |
| 2014/0192363 | A1 | 7/2014 | Kippenberg et al. |
| 2015/0323450 | A1 | 11/2015 | Lipson et al. |
| 2016/0234017 | A1 | 8/2016 | Englund |
| 2017/0131388 | A1 | 5/2017 | Campbell et al. |
| 2018/0241480 | A1 | 8/2018 | Hughes |
| 2019/0163032 | A1 | 5/2019 | Gapontsev et al. |
| 2020/0257502 | A1 | 8/2020 | Steinle |
| 2020/0274703 | A1 | 8/2020 | Lukens |
| 2020/0285131 | A1 | 9/2020 | Marandi et al. |
| 2021/0080805 | A1 | 3/2021 | Srinivasan et al. |
| 2021/0156684 | A1 | 5/2021 | Huang |
| 2021/0247662 | A1 | 8/2021 | Dorche et al. |
| 2022/0075238 | A1 | 3/2022 | Huang et al. |
| 2023/0079367 | A1 | 3/2023 | Huang et al. |
| 2023/0155823 | A1 | 5/2023 | Huang et al. |
| 2023/0168563 | A1 | 6/2023 | Huang et al. |

FOREIGN PATENT DOCUMENTS

| | | | | |
|---|---|---|---|---|
| CN | 107528686 | A | 12/2017 | |
| CN | 111897054 | A | 11/2020 | |
| CN | 112083615 | A | * 12/2020 | ......... H04Q 11/0062 |
| EP | 3477362 | A1 | 6/2019 | |
| EP | 3286603 | B1 | 2/2020 | |
| GB | 2510916 | A | 4/2015 | |
| JP | 4091956 | B2 | 5/2008 | |
| JP | 2017-41189 | A | 2/2017 | |
| KR | 101899026 | B1 | 10/2018 | |
| WO | 2013112351 | A2 | 8/2013 | |
| WO | 2018031916 | A1 | 2/2018 | |
| WO | 2019241582 | A1 | 6/2020 | |
| WO | WO2021226395 | A1 | 11/2021 | |
| WO | WO2023004148 | A1 | 1/2023 | |

OTHER PUBLICATIONS

Santosh Kumar et al, "Large-scale Ising Emulation with Four-Body Interaction and All-to-All Connection", arxiv.org, Cornell University Library, 201 Olin Library Cornell University Ithaca, NY 14853, Jan. 16, 2020 (Jan. 16, 2020), XP081579959, 36 pages.

Pierangeli D et al, "Large-scale photonic Ising machine by spatial light modulation", arxiv.org, Cornell University Library, 201 Olin Library Cornell University Ithaca, NY 14853, May 28, 2019 (May 28, 2019), XP081377516, DOI: 10.1103/PHYSREVLETT. 122. 213902, 6 pages.

Charles Roques-Carmes et al, "Heuristic Recurrent Algorithms for Photonic Ising Machines", arxiv.org, Cornell University Library, 201 Olin Library Cornell University Ithaca, NY 14853, Nov. 7, 2018 (Nov. 7, 2018), XP081556214, 44 pages.

International Search Report mailed on Sep. 8, 2021 in connection with International Patent Application No. PCT/US2021/032338 filed May 13, 2021, 3 pages.

Written Opinion mailed on Sep. 8, 2021 in connection with International Patent Application No. PCT/US2021/032338 filed May 13, 2021, 10 pages.

Examination Report, European Patent Application No. 21730394.0, Jan. 17, 2025, 10 pages.

PCT International Preliminary Report on Patentability for PCT/US2021/032338, mailed on Nov. 15, 2022, 11 pages.

Jason Lin et al., "Quantum private comparison of equality protocol without a third party", arxiv. org, vol. 13, No. 2, Oct. 1, 2013, pp. 239-247.

Goorden, Sebastianus & Horstmann, Marcel & Mosk, Allard & Skoric, Boris & Pinkse, Pepijn. (2013). Quantum-Secure Authentication with a Classical Key.

Arapinis et al. "Quantum Physical Unclonable Functions: Possibilities and Impossibilities." Jun. 15, 2022, Quantum 5, 475 (2021). arXiv:1910.02126v4.

F. Xu, Experimental fast quantum random No. generation using high-dimensional entanglement with entropy monitoring, Optica 3, 1266-1269 (2016).

Hochrainer, Low-Loss Optical Elements for a Loophole-Free Bell Test, 2014 (Thesis).

Lee, H., Chen, T., Li, J. et al. Ultra-low-loss optical delay line on a silicon chip. Nat Commun 3, 867 (2012). https://doi.org/10.1038/ncomms1876.

Fiorentino, Marco & Munro, William & Santori, Charles & Spillane, Sean & Beausoleil, Ray. (2006). All-Fiber-Optic Quantum Random Number Generator. 1-2. 10.1109/CLEO.2006.4628717.

Nguyen L, Rehain P, Sua YM, Huang YP. Programmable quantum random number generator without postprocessing. Opt Lett. Feb. 15, 2018;43(4):631-634. doi: 10.1364/OL.43.000631. PMID: 29444039.

Nguyen, Lac & Rehain, Patrick & Sua, Yong Meng & Huang, Yu-Ping. (2018). Quantum Random Number Generator with Programmable Probability Distributions. JTu3A.30. 10.1364/FIO.2018. JTu3A.30.

Shahverdi A, Sua YM, Dickson I, Garikapati M, Huang YP, "Mode selective up-conversion detection for LIDAR applications", Opt Express. Jun. 11, 2018;26(12):15914-15923. doi: 10.1364/OE.26. 015914. PMID: 30114845.

Geiser, P., Willer, U., Walter, D., and Schade, W., "A subnanosecond pulsed laser-source for mid-infrared LIDAR", Applied Physics B: Lasers and Optics, vol. 83, No. 2, pp. 175-179, 2006. doi:10.1007/s00340-006-2158-5.

Shahverdi, Amin & Sua, Yong Meng & Tumeh, Lubna & Huang, Yu-Ping. (2017). Quantum Parametric Mode Sorting: Beating the Time-Frequency Filtering. Scientific Reports. 7. 10.1038/s41598-017-06564-7.

(56) References Cited

OTHER PUBLICATIONS

J. Lu, J. Surya, X. Liu, A. Bruch, Z. Gong, Y. Xu, and H. Tang, "Periodically poled thin-film lithium niobate microring resonators with a second-harmonic generation efficiency of 250,000%/W," Optica 6, 1455-1460 (2019).

Fu. Y., Guo, M., & Phua, P. B. (2010). Spatially encoded multibeam laser Doppler vibrometry using a single photodetector, Optics Letters, 35(9), 1356-1358.

Yanlu Li, Jinghao Zhu, Matthieu Duperron, Peter O'Brien, Ralf Schüler, Soren Aasmul, Mirko de Melis, Mathias Kersemans, and Roel Baets, "Six-beam homodyne laser Doppler vibrometry based on silicon photonics technology," Opt. Express 26, 3638-3645 (2018).

Patrick Rehain, Jeevanandha Ramanathan, Yong Meng Sua, Shenyu Zhu, Daniel Tafone, and Yu-Ping Huang, "Single-photon vibrometry," Opt. Lett. 46, 4346-4349 (2021).

Jiuyi Zhang, Yong Meng Sua, Jia-Yang Chen, Jeevanandha Ramanathan, Chao Tang, Zhan Li, Yongxiang Hu, Yu-Ping Huang; Carbon-dioxide absorption spectroscopy with solar photon counting and integrated lithium niobate micro-ring resonator. Appl. Phys. Lett. Apr. 26, 2021; 118 (17): 171103. https://doi.org/10.1063/5.0045869.

Tri Cao Doan, Resonant Matter Wave Amplification in Mean Field Theory, arXiv: 1112.3325v1 Quantum Gases, Dec. 14, 2011.

Hu, Yi & Siviloglou, Georgios & Zhang, Peng & Efremidis, Nikolaos & Christodoulides, Demetrios & Chen, Zhigang. (2012). Self-accelerating Airy Beams: Generation, Control, and Applications. 10.1007/978-1-4614-3538-9_1.

Yu-Ping Huang and Prem Kumar, "Mode-resolved photon counting via cascaded quantum frequency conversion," Opt. Lett. 38, 468-470 (2013).

Abijith S. Kowligy, Paritosh Manurkar, Neil V. Corzo, Vesselin G. Velev, Michael Silver, Ryan P. Scott, S. J. B. Yoo, Prem Kumar, Gregory S. Kanter, and Yu-Ping Huang, "Quantum optical arbitrary waveform manipulation and measurement in real time," Opt. Express 22, 27942-27957 (2014).

Jingle Liu, Jianming Dai, See Leang Chin, and X.-C. Zhang, "Broadband terahertz wave remote sensing using coherent manipulation of fluorescence from asymmetrically ionized gases," Nature Photonics, vol. 4, (Sep. 2010).

R. Sferopoulos, "A Review of Chemical Warfare Agent (CWA) Detector Technologies and Commercial-Off-The-Shelf Items," DSTO Defence Science and Technology Organisation, Fishermans Bend, Victoria, Australia (2009).

Scully, et al., "Quantum Optics," Published by Cambridge University Press, 1997.

Huang, et al., "Heralding single photons without spectral factorability", Phys. Rev. A 82, 043826 (2010).

Seth Lloyd, "Enhanced Sensitivity of Photodetection via Quantum Illumination", Science321, 1463-1465(2008), DOI:10.1126/science.1160627.

U.S. Appl. No. 17/899,493, filed Aug. 30, 2022, titled Approaches, Apparatuses, and Methods for Non-Interferometric Quantum Photonics Vibrometry. Yuping Huang et al.

Notice of Grounds for Rejection for Korean Patent Application No. 10-2022-7043525, entitled "Super Ising Emulator With Multi-Body Interactions and All-To-All Connections," issued Oct. 30, 2025, 6 pages.

\* cited by examiner

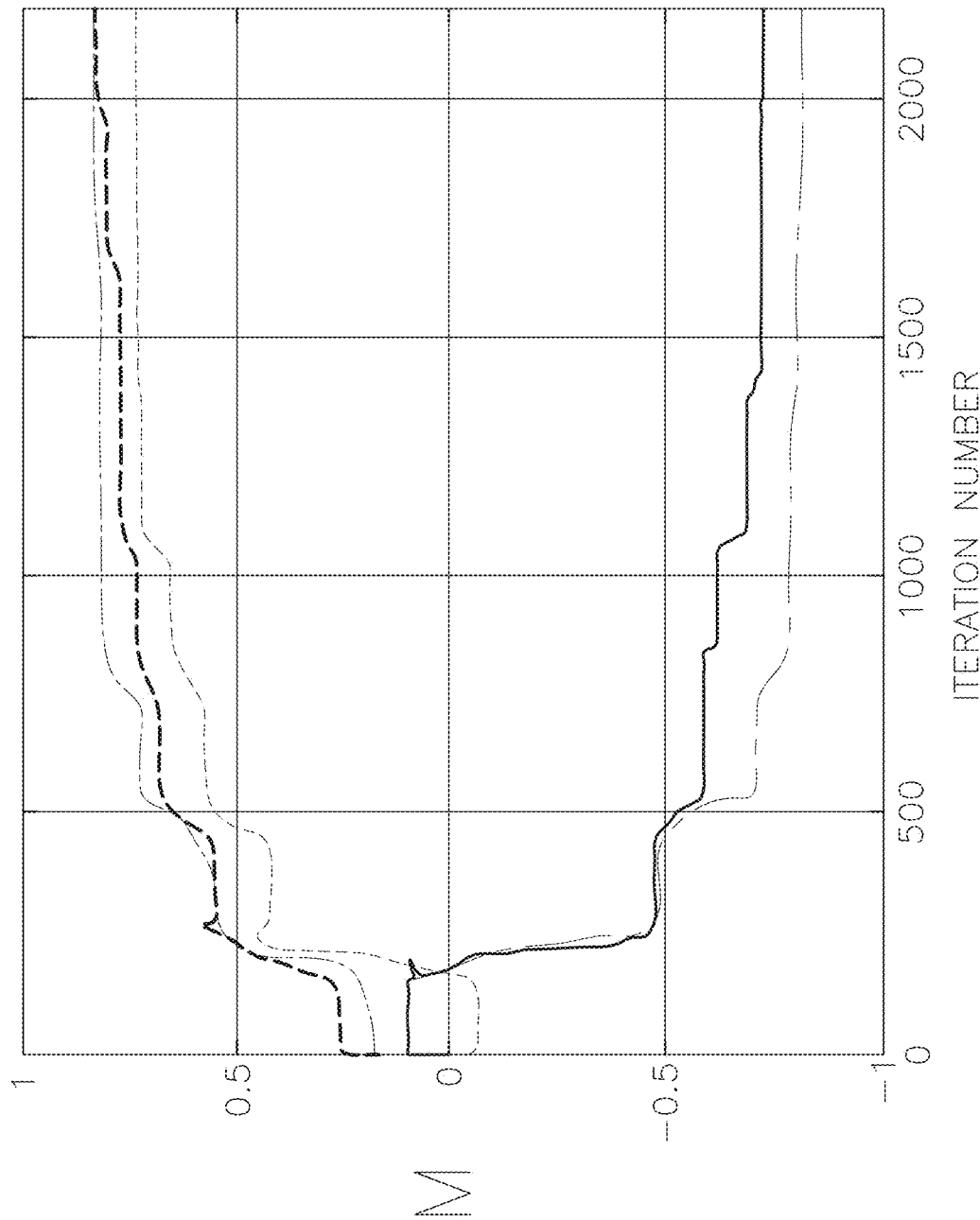

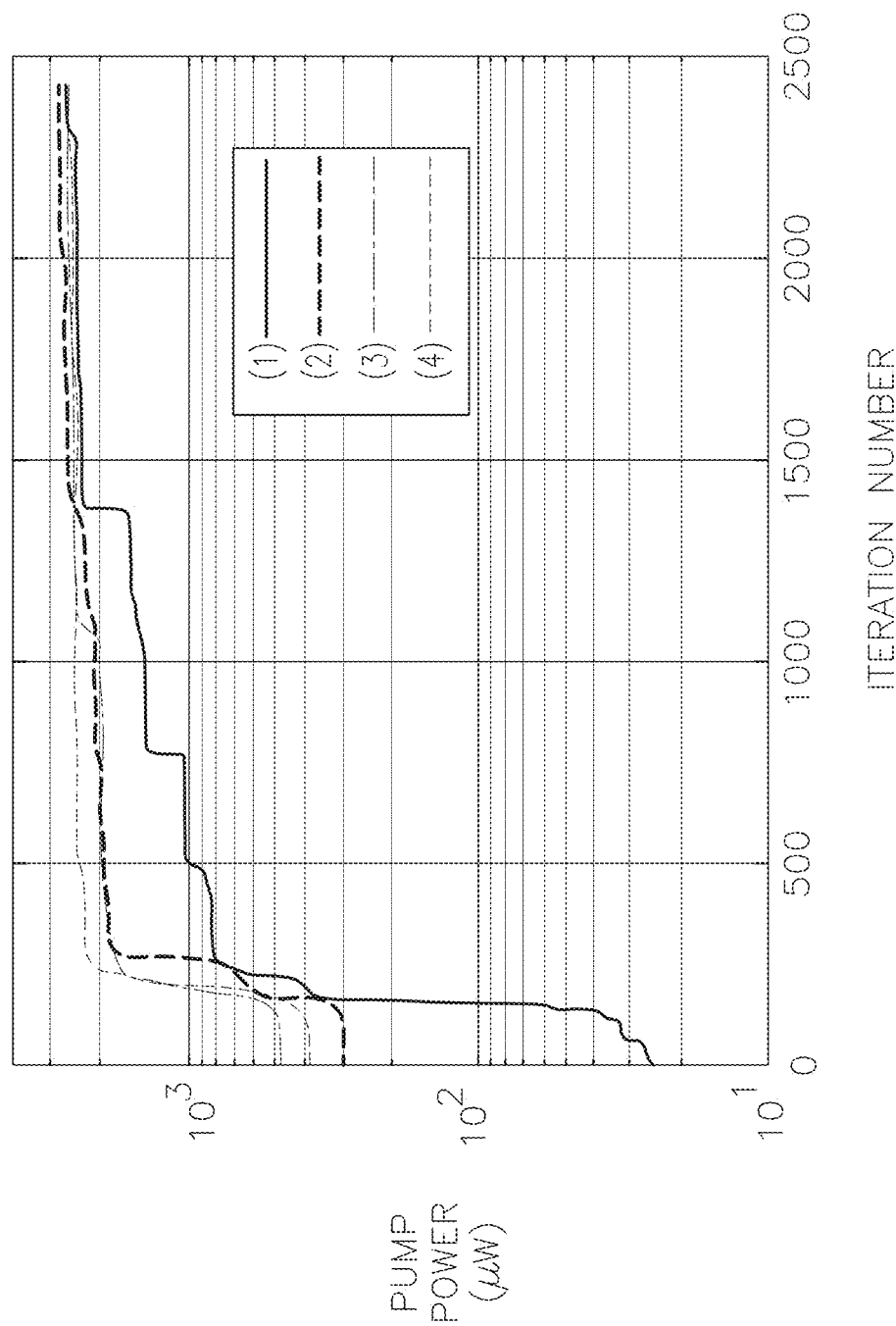

NOT MAX CUT

MAX CUT

GRAPH

SUPER ISING EMULATOR WITH MULTI-BODY INTERACTIONS AND ALL-TO-ALL CONNECTIONS

CROSS-REFERENCE TO RELATED APPLICATION

This application is a U.S. National Phase entry under 35 U.S.C. 371 and claims priority to International Patent Application No. PCT/US2021/032338 filed on May 13, 2021, which claims priority to and the benefit of U.S. Provisional Patent Application No. 63/024,257 filed in the United States Patent and Trademark Office on May 13, 2020, the entire disclosure of each of said applications being incorporated by reference herein.

STATEMENT OF GOVERNMENT INTEREST

This invention was made with government support under Grant Numbers 1806523 and 1842680 awarded by the National Science Foundation (NSF). The government has certain rights in the invention.

FIELD

Aspects of embodiments of the present disclosure are generally related to processing systems for solving combinatorial optimization problems and methods of using the same.

BACKGROUND

Photonic systems are currently being used to find the approximate ground states of the complex system such as a fast coherent ising machine in a fiber looped optical parametric oscillator cavity with temporally multiplexed pulses, albeit with limited spin numbers or relying on photodetection and electronic feedback to emulate the spin-spin interaction. Also, a linear-optical ising machine based on spatial light modulation was shown to subtend about 80,000 spins by coding them as the binary phases of pixels on a spatial light modulator (SLM). However, this machine is limited to only two-body interactions. Yet, there are physical systems and numeric models whose dynamics cannot be fully captured by two-body interactions, and proper descriptions of multi-body interaction are required, such as k-SAT (k-satisfiability) problems. This poses a significant computational challenge, whose complexity and volume exceeds by far that of ising problems with only two-body interaction, even for a moderate number of spins.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure relate to systems and methods for emulating an ising machine and capable of supporting simultaneously high connectivity, multi-body interaction, and a large number of spins.

According to some embodiments of the present invention, there is provided an optical computation system including: a light source configured to produce a pump beam; an optical modulator configured to receive a modulation mask and to modulate the pump beam based on the modulation mask to generate a modulated beam; a non-linear medium configured to convert a portion of the modulated beam to a second harmonic (SH) beam and to produce an output including the SH beam and an unconverted portion of the pump beam; and a dichroic mirror configured to receive the output of the non-linear medium and to decouple the SH beam and the unconverted portion of the pump beam; a detector configured to detect a first optical power of the unconverted portion of the pump beam and to detect a second optical power of the SH beam; and a controller configured to generate an updated modulation mask based on the first and second optical powers for transmission to the optical modulator.

In some embodiments, the optical modulator includes a spatial light modulator that is configured to modulate phases of wavelets of the pump beam to generate the modulated beam.

In some embodiments, the modulation mask is a random binary phase pattern.

In some embodiments, the spatial light modulator is configured to modulate phases of wavelets of the pump beam by encoding a phase of each one of the wavelets as either a first phase or a second phase based on the modulation mask, and the first and second phases are 180 degrees apart.

In some embodiments, the optical modulator includes a digital micromirror device that is configured to modulate intensities of wavelets of the pump beam to generate the modulated beam.

In some embodiments, the optical computation system further includes: a first lens configured to focus the modulated beam inside of the non-linear medium; and a second lens configured to collimate the output of the non-linear medium onto the dichroic mirror.

In some embodiments, the detector includes: a first photodetector configured to detect the first optical power of the unconverted portion of the pump beam; and a second photodetector configured to detect the second optical power of the SH beam, and wherein the non-linear medium includes a periodic-poled lithium niobate crystal.

In some embodiments, the modulation mask includes a plurality of pixels, and the controller is configured to identify a cluster of the pixels based on the first and second optical powers, and to generate the updated modulation mask by inverting pixels of the cluster of the pixels.

According to some embodiments of the present invention, there is provided a method of controlling an optical computation system to determine an approximate ground state of a system energy, the method including: driving a light source to generate a pump beam; generating a phase mask; applying the phase mask to a spatial light modulator to modulate phases of wavelets of the pump beam to generate a modulated beam based on the phase mask; and receiving a first optical power of the pump beam and a second optical power of a second harmonic (SH) beam generated based on the pump beam from a detector, wherein the generating the phase mask includes: identifying a cluster of the phase mask; determining a current system energy based on the first optical powers; determining whether to update the phase mask based at least on the system energy and a previous minimum system energy; and in response to determining to update the phase mask, updating the phase mask based on the cluster of the phase mask.

In some embodiments, the generating the phase mask further includes: in response to determining not to update the phase mask, identifying a lesser of the current system energy and the previous minimum system energy as the approximate ground state.

In some embodiments, the generating the phase mask further includes: identifying a thermal energy; calculating a change in system energy based on the current system energy and the previous minimum system energy; and determining a boltzmann probability based on the change in system energy and the thermal energy, and the determining whether to update the phase mask is further based on the boltzmann probability.

In some embodiments, the determining whether to update the phase mask includes: determining that a feedback iteration count is less than a threshold; determining to update the phase mask.

According to some embodiments of the present invention, there is provided an optical computation system including: a light source configured to produce a pump beam; an optical modulator configured to receive a modulation mask and to modulate the pump beam based on the modulation mask to generate a modulated beam; a non-linear medium configured to convert a portion of the modulated beam to a second harmonic (SH) beam and to produce an output including the SH beam and an unconverted portion of the pump beam; and a dichroic mirror configured to receive the output of the non-linear medium and to decouple the SH beam and the unconverted portion of the pump beam; a first camera configured to capture the unconverted portion of the pump beam and to generate a first intensity matrix; a second camera configured to capture the unconverted portion of the pump beam and to generate a second intensity matrix; and a controller configured to generate an updated modulation mask based on at least one of the first and second intensity matrices for transmission to the optical modulator.

In some embodiments, the optical modulator includes a spatial light modulator that is configured to modulate phases of wavelets of the pump beam to generate the modulated beam, and the modulation mask is a binary phase pattern.

In some embodiments, the spatial light modulator is configured to modulate phases of wavelets of the pump beam by encoding a phase of each one of the wavelets as either a first phase or a second phase based on the modulation mask, and the first and second phases are 180 degrees apart.

In some embodiments, the optical modulator includes a digital micromirror device that is configured to modulate intensities of wavelets of the pump beam to generate the modulated beam.

In some embodiments, the controller is configured to generate the updated modulation mask by: determining a camera state as the first intensity matrix, the second intensity matrix, or a weighted sum of the first and second intensity matrices; and determining the updated modulation mask based on the modulation mask and the camera state.

In some embodiments, the determining the updated modulation mask based on the modulation mask and the camera state includes: determining the updated modulation mask as a difference between the modulation mask and a multiplication of the camera state and a feedback step size.

In some embodiments, the pump beam includes a gaussian pulse of a train of gaussian pulses generated by the light source, and the feedback step size corresponds to a periodicity of the train of gaussian pulses.

In some embodiments, the controller is configured to adaptively adjust the feedback step size prior to generating the updated modulation mask.

According to some embodiments of the present invention, there is provided an optical computing system including: an optical amplifier configured to generate a pump beam with a flat phase front; a degenerate optical parametric amplifier configured to generate a signal of double wavelength in small wavelets based on the pump beam; an optical filter configured to filter the pump beam from the signal; an optical beam splitter configured to read out a fraction of the signal; a nonlinear optical crystal configured to generate second-harmonic light based on the signal; a first dual-band reflector configured to separate the signal and the second-harmonic light; an optical receiver configured to couple the second-harmonic light into the optical amplifier; and a second dual-band reflector configured to combine the signal and second-harmonic light into the degenerate optical parametric amplifier.

In some embodiments, the optical computing system further includes: a first fourier lens configured to focus the signal into the nonlinear optical crystal for generation of second-harmonic light; and a second fourier lens between the first and second dual-band reflectors and configured to defocus the signal.

In some embodiments, each of the first and second dual-band reflectors includes a dichroic mirror or an optical filter.

In some embodiments, as the signal continuously traverses the optical computing system, an optical gain of the optical amplifier is increased until optical parametric oscillation occurs.

In some embodiments, the optical computing system further includes a first optical modulator between the degenerate optical parametric amplifier and the nonlinear optical crystal and configured to modulate the signal prior to the signal reaching the nonlinear optical crystal to change an effective four-body interaction Hamiltonian of the optical computing system.

In some embodiments, the optical computing system further includes a second optical modulator between the nonlinear optical crystal and the optical receiver and configured to modulate the second-harmonic light to change an effective four-body interaction Hamiltonian of the optical computing system.

According to some embodiments of the present invention, there is provided an optical computing system including: an optical amplifier configured to generate an amplified signal with a flat phase front; an nonlinear optical device configured to receive the amplified signal and to generate a pump beam through second-harmonic generation based on the amplified signal; a degenerate optical parametric amplifier configured to generate a signal of double wavelength in small wavelets based on the pump beam; an optical filter configured to filter the pump beam from the signal; a first optical beam splitter configured to read out a fraction of the signal; a second optical beam splitter configured to direct a first portion of the signal to an optical modulator for modulation of the portion of the signal and to direct a second portion of the signal to a dichroic mirror; and an optical receiver configured to couple the modulated first portion of the signal into the optical amplifier to generate the amplified signal, wherein the dichroic mirror is configured to combine the second portion of the signal with the pump beam and into the degenerate optical parametric amplifier.

In some embodiments, the optical modulator includes a spatial light modulator or a digital micromirror device, and the nonlinear optical device includes a nonlinear optical crystal or an optical waveguide.

BRIEF DESCRIPTION OF THE DRAWINGS

The accompanying drawings, together with the specification, illustrate example embodiments of the present disclosure, and, together with the description, serve to explain the principles of the present disclosure.

DETAILED DESCRIPTION

Figure 1:
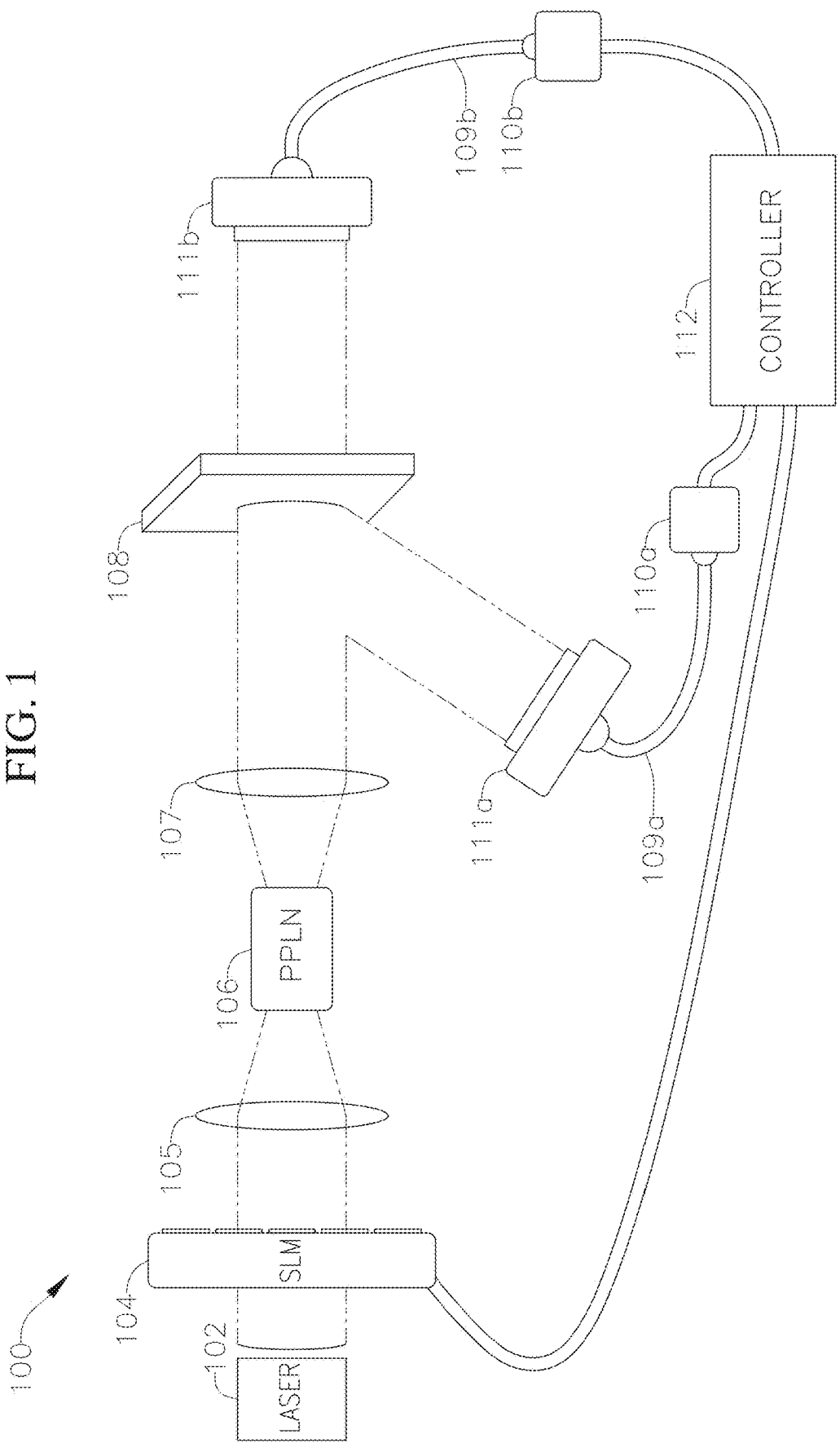
FIG. 1 illustrates an optical computation system, according to some embodiments of the present disclosure.

The detailed description set forth below is intended as a description of example embodiments of systems and methods for emulating an ising machine for solving impossible or difficult to solve combinatorial optimization problems, provided in accordance with the present disclosure, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Throughout the specification, terms may have nuanced meanings suggested or implied in context beyond an explicitly stated meaning.

The present invention relates to an optical computation system/ising machine that can solve many combinatorial optimization problems, which are impossible or difficult to solve using existing modern-day computers. More particularly, it relates to machines that can solve combinatorial optimization problems in areas such as in life sciences for protein folding and drug discovery, in sociology to study the influence of social networking, in grapy theory to find the cut with maximum number of edges (MAX-CUT), and in computer science to determine the Boolean satisfiability (k-SAT). More generally, the present invention relates to non-deterministic, polynomial, time-hard problems, such as those above, that are rooted in multi-body interactions.

According to some embodiments, the systems and methods of the present disclosure are directed to an optical computation system (also referred to herein, as an ising machine/emulator) capable of adjustable two-body interaction, four-body interaction, with all-to-all connections over a large number of spins to host the ising machine. The energy (e.g., chemical potential) of each spin and their collective contribution to the total energy can be flexibly controlled using spatial light modulator (SLM). The optical measurement of the pump power and its second harmonic (SH) power can emulate the two-body and four-body interactions, respectively. A Monte-Carlo based adaptive feedback controller is utilized to evolve the effective spin system to find an approximate ground state solution of a given ising problem. The high-order, many-body interaction emulated by the systems of the present disclosure can also serve as powerful activation functions for optical machine learning. The main computing tasks such as matrix multiplication, Fourier transformation, and four-body interactions, are performed via or emulated by nonlinear optical systems. The present ising emulator may pave a pathway to otherwise inaccessible territories of big data analytics and quantum simulation.

According to some embodiments, the optical computation system includes a nonlinear optical system capable of emulating ising machines containing a very large number of spins, for example, a million spins or higher. The optical computation system is capable of manipulating two and four-body interactions with all-to-all connections. It utilizes a spatial light modulator to encode and control the spins in the form of the binary phase values of wavelets in coherent laser beams and emulates the high-order interaction with frequency conversion in a nonlinear crystal at the fourier plane. Through adaptive feedback control, the system can be evolved into effective spin configurations that well approximate the ground states of ising Hamiltonians with all-to-all connected many-body interactions.

In effect, the optical computation system encodes a given many-body problem using a laser and spatial light modulator, and performs computing operations, such as fourier transform, matrix multiplication, and nonlinear interactions, by the optical elements and nonlinear processes performed by them. The optical computation system uses single-mode optical fibers connected with optical power-meters or cameras to perform measurements, and uses the detected signals to provide adaptive feedback (e.g., via monte-carlo spin flipping) to evolve the system. The optical computation system includes a laser, a spatial light modulator, optical elements, a nonlinear crystal, single mode fibers, and one or more cameras and/or power-meters.

FIG. 1 illustrates an optical computation system 100, according to some embodiments of the present disclosure.

The optical computation system 100 (also referred to as an optically-based computation system) may be a nonlinear optical ising machine capable of emulating chemical potential, two-body interactions, and four-body interactions over a large number of spins. Thus, the optical computation system is one in which a photonic beam is manipulated in performance of a computation.

According to some embodiments, the optical computation system (e.g., ising emulator) 100 includes a light source (e.g., a laser) 102, a spatial light modulator (SLM) 104, a non-linear medium (e.g., a periodic-poled lithium niobate (PPLN) crystal) 106, a dichroic mirror 108, a detector 110, and a controller 112.

The light source 102 is configured to produce the gaussian pump beam that is input to the SLM 104. In some examples, the light source 102 generates an optical pulse train. The transverse FWHM of the pump beam incident on the SLM 104 may be about 2.6 mm or a different value, depending on the size of SLM 104.

The SLM 104 is configured to receive a modulation mask (e.g., a phase mask) and to modulate phases of wavelets of the pump beam to generate modulated (e.g., spatially modulated) wavelets based on the phase mask. In some examples, the SLM 104 may have a high enough resolution (e.g., 1440×1050 pixels) to encode a phase mask of over a million pixels/spins onto the gaussian beam. In some embodiments, the phase mask is a binary phase mask with each pixel corresponding to a phase value of 0 or $\pi$. In some embodiments, the optical computation system 100 further includes a first lens 105 (e.g., a focusing lens having a focal length of about 200 mm) that is configured to focus the modulated beams inside (e.g., near the center) of the non-linear medium 106.

In some embodiments, the non-linear medium 106, which may be a temperature-stabilized PPLN crystal, is configured to perform a non-linear process to generate a secondary harmonic (SH) beam based on the modulated pump beam. The SH generation realizes the effective interactions between the spins. In some examples, the PPLN crystal may have a poling period of about 19.36 µm and a length of about 1 cm for the SH generation. The pump beam waist inside the crystal may be about 45 µm.

The optical computation system utilizes a second lens (e.g., a collimation lens) 107 to collimate (e.g., align) the SH beam and the remaining pump beam (i.e., the unconverted pump beam) output by the non-linear medium 106 onto the dichroic mirror 108. In some embodiments, the dichroic mirror 108 (or dual-wavelength reflector) is configured to filter the collimated output of the non-linear medium 106 to decouple (e.g., spatially separate) the SH beam and the remaining/unconverted pump beam, which may be coupled into single-mode fibers (SMFs) 109a and 109b using fiber couplers/collimators (e.g., aspheric lenses) 111a and 111b. In some embodiments, the detector 110 includes two optical power meters (e.g., photodiodes) 110a and 110b respectively coupled to the SMFs 109a and 109b, which separately measure the optical power of the SH beam and the remaining pump beam.

In some embodiments, the optical computation system uses the measured pump power to emulate the energy associated with two-body (i.e., spin-spin) interaction, and the measured SH power is used to capture the four-body interaction among spins. The total potential energy (e.g., total chemical potential energy) is the weighted sum of all spins encoded at the SLM 104. The controller 112 then updates the phase mask at the SLM 104 based on the measure pump and SH powers to iteratively find the optimum ground state solution, or an approximation thereof, of the ising problem being emulated by the optical computation system 100.

According to some embodiment, the detector 110 measures the spatial optical power of the pump and SH beams using two CCD cameras with many pixels. The controller 112 then uses the CCD camera results an input to the next iterative step on the SLM 104.

In other embodiments, the feedback control is implemented using an optical loop and the spatial light modulator is replaced by a nonlinear optical device.

The effective Hamiltonian of the optical computation system is expressed as:

$$H = \alpha H_1 + \beta_2 + \gamma H_4, \qquad \text{Eq (1)}$$

where $\alpha, \beta$, and $\gamma$ are adjustable parameters of the Hamiltonians, $H_1$, $H_2$ and $H_4$ represents the chemical potential, two-body interaction and four-body interaction, respectively. These can be expressed as $$H_1 = \Sigma_{i=1}^N \mu_i \hat{S}_i, \qquad \text{Eq (2)}$$

$$H_2 = \Sigma_{i=1}^N \Sigma_{j=1}^N J_{ij} \hat{S}_i \hat{S}_j, \text{ and} \qquad \text{Eq (3)}$$

$$H_4 = \Sigma_{i=1}^N \Sigma_{j=1}^N \Sigma_{s=1}^N \Sigma_{r=1}^N J_{ijsr} \hat{S}_i \hat{S}_j \hat{S}_s \hat{S}_r. \qquad \text{Eq (4)}$$

Here, the light source 102 produces a gaussian pump beam of wavelength $\lambda_p$ with peak amplitude $E_0$, and beam waist $w_p$. The pump beam incident on a SLM 104 whose phase mask consists of m×n pixels (m,n) centered around $(x_m', y_m')$. The transverse electric field immediately after the SLM 104 is $$E_p(x', y') = \sum_{m=1}^{N_1} \sum_{n=1}^{N_1} \sigma_{mn} \xi_{mn} \frac{1}{a^2} \prod\left(\frac{x' - x_m'}{a}\right) \prod\left(\frac{y' - y_m'}{a}\right), \qquad \text{Eq (5)}$$

where $$\xi_{mn} = E_0 \exp\left[-\frac{x_m'^2 + y_m'^2}{w_p^2}\right]$$

is the amplitude at pixel (m,n), $\Pi$ is the rectangular function of width $\alpha$, and $\sigma_{mn} = \pm 1$ (binary phase modulation).

A fourier lens of focal length F can transform the electric field at the center of a periodic-poled lithium niobate (PPLN) crystal of length L. It gives $$E_p(x, y, z = 0) = \qquad \text{Eq (6)}$$

$$\sum_{m=1}^{N_1} \sum_{n=1}^{N_1} \sigma_{mn} \xi_{mn} v_{mn} \mathrm{sinc}\left(\frac{a x \pi}{f \lambda_p}\right) \mathrm{sinc}\left(\frac{a y \pi}{f \lambda_p}\right) \exp(i \kappa_p z),$$

where, $$v_{mn} = \exp\left(-2\pi i \frac{x x_m'^2 + y y_m'^2}{f \lambda_p}\right).$$

$\kappa_p = 2\pi n_p / \lambda_p$, and $n_p$ is the refractive index of the pump in the PPLN crystal. As only near-axis light is coupled into the SMFs 109a and 109b, it makes the $\mathrm{sinc}(\alpha x \tau / \Delta_p f) \approx \mathrm{sinc}(\alpha y \tau / \Delta_p f) \approx 1$, and simplifies the above equation as $$E_p(x,y,z) \approx \Sigma_{m=1}^{N_1} \Sigma_{j=1}^{N_1} \sigma_{mn} \xi_{mn} v_{mn} \exp(i \kappa_p z). \qquad \text{Eq (7)}$$

By using contracted notations $\xi_{i=m+(n-1)N_1} \square \xi_{mn}$, and $\sigma_{i=m+(n-1)N_1} \square \sigma_{mn}$, were introduced to simplify the double summation in the above equation, where i=1, 2, . . . N with $N = N_1 \times N_1$ spins, Equation 7 may be expressed as $$E_p(x,y,z) = \Sigma_{i=1}^N \sigma_i \xi_i v_i \exp(i \kappa_p z). \qquad \text{Eq (8)}$$

The dynamics of the pump and the SH beams, inside the non-linear medium 106, may be evaluated by following equations $$\frac{\partial E_p}{\partial z} + \frac{1}{2 i \kappa_p}\left(\frac{\partial^2}{\partial x^2} + \frac{\partial^2}{\partial y^2}\right) E_p = i \frac{\kappa_p}{n_p^2} \chi^{(2)} E_p^* E_{SH} \exp(i \Delta \kappa z), \qquad \text{Eq (9)}$$

$$\frac{\partial E_{SH}}{\partial z} + \frac{1}{2 i \kappa_{SH}}\left(\frac{\partial^2}{\partial x^2} + \frac{\partial^2}{\partial y^2}\right) E_{SH} = i \frac{\kappa_{SH}}{2 n_{SH}^2} \chi^{(2)} E_p^2 \exp(-i \Delta \kappa z), \qquad \text{Eq (10)}$$

where $\kappa_{SH} = 2 \pi n_{SH} / \lambda_{SH} = n_{SH} \omega_{SH} / C$ is the wave number of the SH light in the crystal with refractive index $n_{SH}$, $\omega_{SH}$ is the frequency of the SH light, and $\Delta\kappa=2\kappa_p-\kappa_{SH}-2\pi/\Lambda$ is the phase mismatching, with poling period $\Lambda$. Assuming a phase matching condition with an undepleted pump and negligibly small diffraction, $$E_h\left(x, y, \frac{L}{2}\right) = A\, E_p^2\left(x, y, -\frac{L}{2}\right), \quad \text{Eq (11)}$$

where $A=i\kappa_{SH}X^{(2)}L/(2\,n_{SH}^2)$. At the output of the nonlinear medium 106, the pump and SH waves are each coupled into a single mode fiber and detected by the optical power meters (e.g., photodiodes) 110a and 110b. The optical powers of the pump and SH waves are $$P_p = |\iint E_p(x,y) E_{fib}^p dxdy|^2, \quad \text{Eq (12)}$$

and $$P_h = |\iint E_h(x,y) E_{fib}^h dxdy|^2, \quad \text{Eq (13)}$$

respectively, where $$E_{fib}^{p,h} = \sqrt{\frac{2}{\pi}} \frac{1}{w_{fib}^{p,h}} \mathrm{Exp}\left(-\frac{x^2+y^2}{(w_{fib}^{p,h})^2}\right)$$

are the normalized back-propagated fiber modes with beam waists $w_{fib}^p$ and $w_{fib}^h$, respectively.

Hence, the detected optical power of the pump wave and the SH waves are $$P_p = 2\pi(w_{fib}^p)^2 \sum_{i=1}^{N} \sum_{j=1}^{N} \xi_i \xi_j \xi_i^{fib} \xi_j^{fib} \sigma_i \sigma_j, \quad \text{Eq (14)}$$

and $$P_h = 2\pi(w_{fib}^h)^2 A^2 \sum_{i=1}^{N} \sum_{j=1}^{N} \sum_{s=1}^{N} \sum_{r=1}^{N} \xi_i \xi_j \xi_s \xi_r \xi_{is}^{fib} \xi_{jr}^{fib} \sigma_i \sigma_j \sigma_s \sigma_r, \quad \text{Eq (15)}$$

where $$\xi_{i=\{m+(N_1-1)n\}}^{fib} = \exp\left[-\left(\frac{\pi w_{fib}^p}{f\lambda_p}\right)^2 (x_m'^2 + y_m'^2)\right]$$

and $$\xi_{i=\{m+(N_1-1)n\}s=\{l+(N_1-1)k\}}^{fib} = \exp\left[-\left(\frac{\pi w_{fib}^p}{f\lambda_p}\right)^2 \{(x_m'+x_l')^2 + (y_n'+y_k')^2\}\right].$$

Thus:

$$P_p = \sum_{i=1}^{N} \sum_{j=1}^{N} J_{ij} \sigma_i \sigma_j \quad \text{Eq (16)}$$

and $$P_h = \sum_{i=1}^{N} \sum_{j=1}^{N} \sum_{s=1}^{N} \sum_{r=1}^{N} J_{ijsr} \sigma_i \sigma_j \sigma_s \sigma_r, \quad \text{Eq (17)}$$

where $J_{ij}=2\pi(w_{fib}^p)^2 \xi_i \xi_j \xi_i^{fib} \xi_j^{fib}$ and $J_{ijsr}=2\pi(w_{fib}^h)^2 A^2 \xi_i \xi_j \xi_s \xi_r \xi_{is}^{fib} \xi_{jr}^{fib}$ are the two-body, and four-body interaction terms, respectively.

Here, the total energy of the system, including all of the spins and their two-body and four-body interactions, can be characterized by the single parameter defined as $$E = \alpha C + \beta P_p + \gamma P_h, \quad \text{Eq (18)}$$

where $\alpha$, $\beta$, and $\gamma$ are free parameters defining the contribution of the chemical potential, two-body, and four-body interaction energy, respectively. By appropriately setting the free parameters, the optical computation system 100 may model an ising problem. $C=\sum_{i=1}^{N} \mu_i \sigma_i$ is the weighted sum of spins that represents the chemical energy, with the local chemical potential $\mu_i \in [-1,1]$. Equation (18) is equivalent to the effective Hamiltonian defined in Eq. (1) of the system to find the ground state solution. The magnetization of the system can be defined as $M=\sum_{i=1}^{N} \sigma_i/N$. To find the minimum or an approximation of the minimum of the total energy of the system, the controller 112 iteratively updates (e.g., optimizes) the phase mask at the SLM 104 through adaptive feedback.

Figure 2:
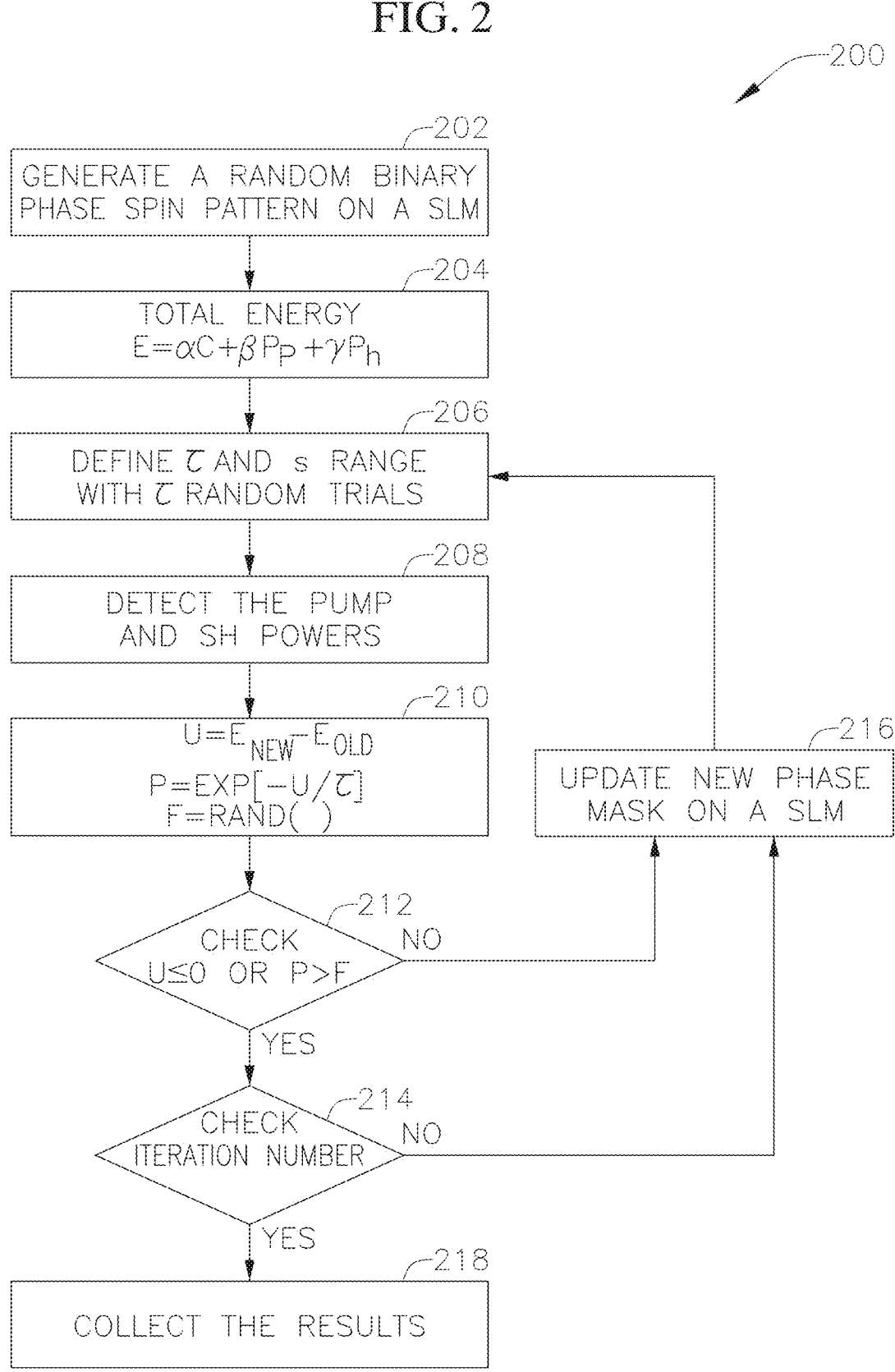
FIG. 2 illustrates a process of controlling the optical computation system to identify an approximate ground state of a system energy, according to some embodiments of the present disclosure.

FIG. 2 illustrates a process 200 of controlling the optical computation system 100 to identify an approximate ground state of a system energy, according to some embodiments of the present disclosure. It should be understood that the sequence of steps of the process is not fixed, and can be modified, changed in order, performed differently, performed sequentially, concurrently, or simultaneously, or altered into any desired sequence, as recognized by a person of skill in the art.

At block 202, the controller 112 drives the light source 102 to generate a primary pump beam, generates an initial phase mask, which may be a random binary phase mask, and applies the initial phase mask to the SLM 104 to modulate phases of wavelets of the pump beam to generate a modulated beam based on the initial phase mask.

At block 204, the controller 112 defines the energy of the system being emulated by the optical computation system 100 via Equation 18. In so doing, the controller 112 determines the free parameters $\alpha$, $\beta$, and $\gamma$ to respectively define the contributions of the chemical potential, two-body, and four-body interaction energy, in order to model the ising problem being emulated by the optical computation system 100.

At block 206, the controller 112 defines (e.g., randomly choses) a cluster of pixels in the phase mask having a size s and a thermal energy $\tau$ of the system. In some embodiments, the phase mask may have a square or rectangular shape with s pixels. However, embodiments of the present disclosure are not limited thereto, and the cluster may have any suitable shape. Here, the thermal energy $\tau$ may simply be a parameter for this optimization algorithm and may not be a physical quantity.

At block 208, the controller 112 receives a first optical power of the primary pump beam and a second optical power of the SH beam from the detector 110.

At block 210, the controller 112 determines a current system energy $E_{new}$ using Equation 18 and based on the first and second optical powers and the free parameters $\alpha$, $\beta$, and $\gamma$ determined at block 204. The controller 112 calculates a change in system energy U as the difference between the current system energy and a previous minimum system energy $E_{old}$ ($U=E_{new}-E_{old}$). The controller 112 further determines a Boltzmann's probability $P=\exp(-U/\tau)$.

At blocks 212 and 214, the controller 112 determines whether to update the phase mask at the SLM or not. In so doing, at block 212, the controller checks whether an optimization criterion based on the current system energy and the Boltzmann's probability is satisfied. The criterion is satisfied when the change in system energy U is negative (i.e., the current system energy $E_{new}$ is the lowest system energy calculated thus far) or if the Boltzmann's probability P is greater than a random variable F, which is a real value between 0 and 1. When neither of these conditions is met, the controller 112 determines to update the new phase mask, at block 216. In so doing, the controller 112 generates a new phase mask by flipping the spins in the randomly chosen cluster of size s (block 206) of the previous phase mask. When the optimization criterion is met, the controller also determines whether the number of iterations (e.g., the feedback iteration count) is less than a threshold (e.g., 1200). If so, the controller 112 proceeds to update the phase mask at block 216.

When the controller 112 determines not to further update the phase mask, at block 218, the controller 112 collects the results to identify a lesser of the current system energy and the previous minimum system energy as the approximate ground state.

Thus, to reduce (e.g., minimize) the total energy, the controller 112 adaptively flips all spins within a randomly chosen cluster of size s, following the Monte Carlo approach. In each iteration, the flipped spins are accepted or rejected according to the energy change function U and Boltzmann's probability P=exp(-U/τ), where U=$E_{new}$-$E_{old}$ is the change in energy due to the spin flipping and τ is the thermal energy. In order to avoid trapping in a local minimum, both the cluster size s and the thermal energy during iterations are varied.

FIGS. 3-6 are graphs illustrating the capability of the optical computation system 100 to evolve its output into the vicinity of its energy ground state, according to some example embodiments of the present disclosure.

Figure 3A:
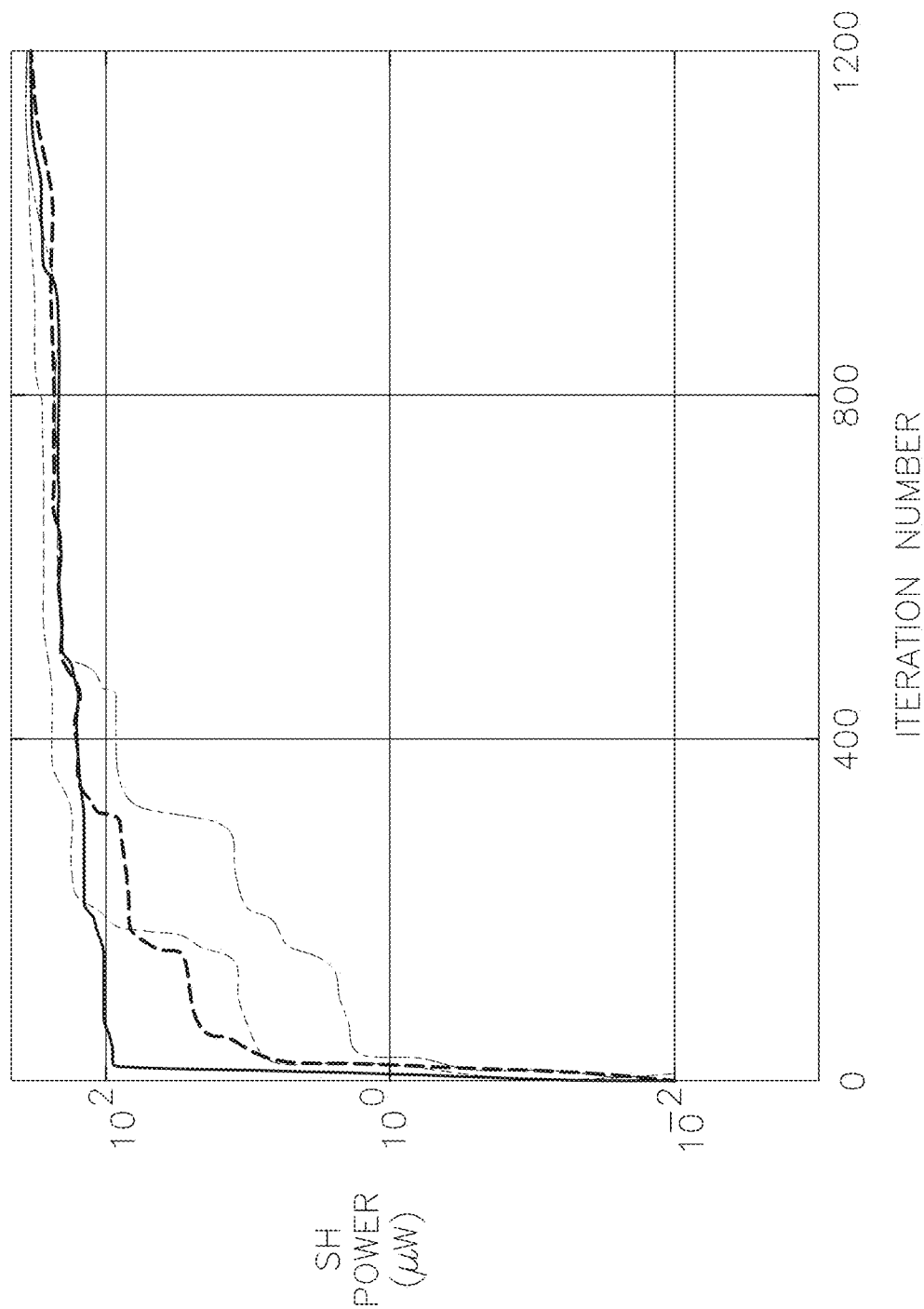
FIGS. 3-6 are graphs illustrating the capability of the optical computation system to evolve its output into the vicinity of its energy ground state, according to some example embodiments of the present disclosure.
Figure 3B:
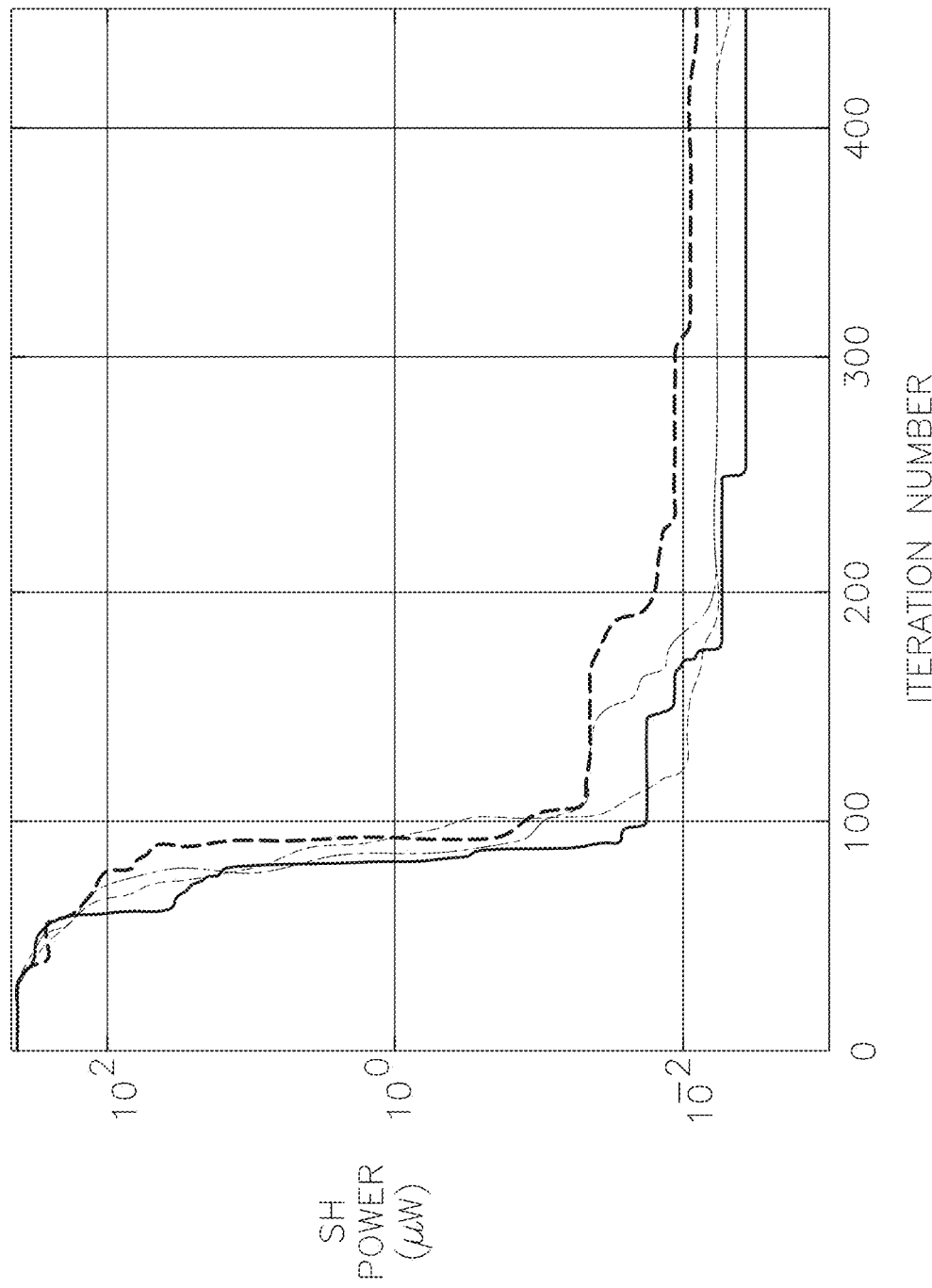

FIG. 3 illustrates the results for purely four-body interactions and all-to-all connections with 800×800 spins, that is, α=0 and β=0 (see, Equation 18). FIG. 3(a) plots the SH beam power evolution for γ=-1, for which the system's ground state correspond to the maximum SH power. In this case, the system exhibits a ferromagnetic-like behavior. Conversely, FIG. 3(b) plots the evolution of the SH power for γ=1, to find the ground state by minimizing the SH power. The minimum detectable SH power is close to the limit of the optical sensor (~5 nW). In this example, the system evolves into a paramagnetic-like state. In both FIGS. 3(a) and 3(b), the system evolves to find the ground state solution even though the data displayed in the figures start with different initial phase masks (corresponding to different random spin configurations). This shows that a machine made in accordance with an embodiment of the present invention can reliably and efficiently evolve into the vicinity of its ground state.

Figure 4A:
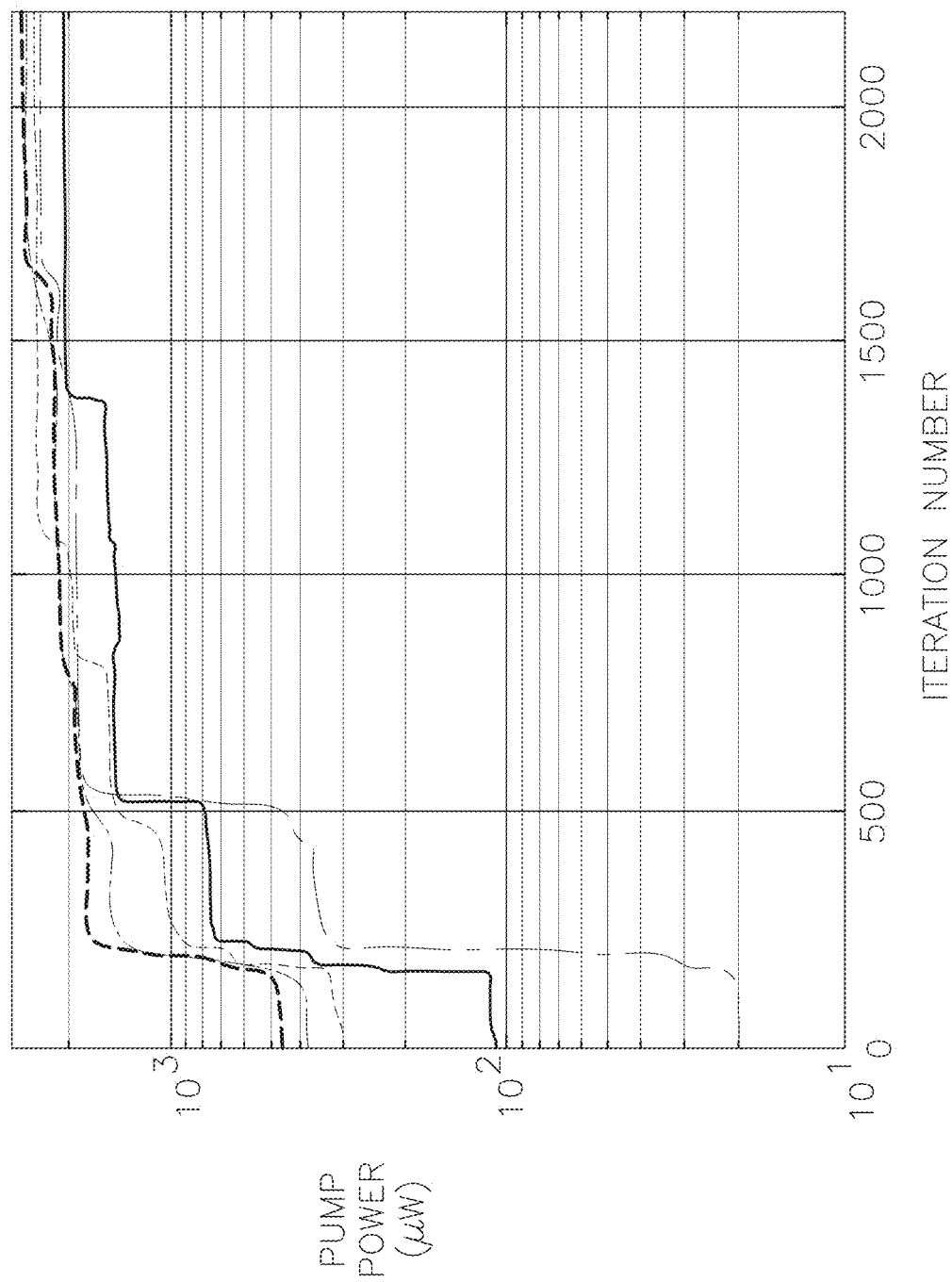

FIG. 4 illustrates two-body interactions and all-to-all connections with 800×800 spins, that is, α=0, β=-1, and γ=0. FIG. 4(a) shows the evolution of the pump optical power. As the pump power increases, it evolves the system to minimize the total energy E. FIG. 4(b) shows the evolution of the magnetization M. With α=0, there is spontaneous symmetry breaking, as the system energy remains unchanged if all spins are flipped. As such, the feedback control will optimize the spins toward either positive or negative magnetic states with equal probability. This is clear in FIG. 4(b), where the magnetization trends both ways.

Figure 5A:
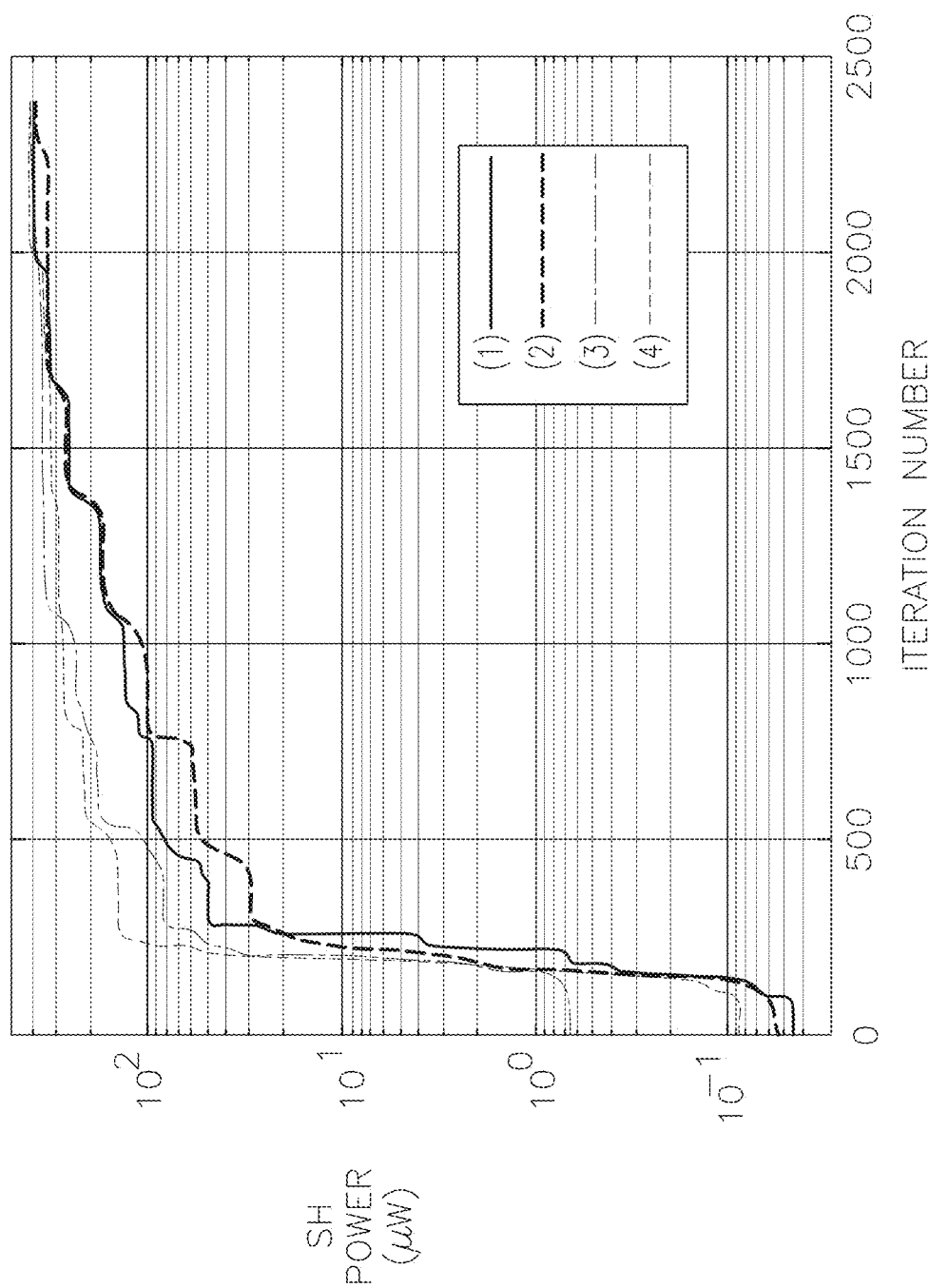
Figure 5C:
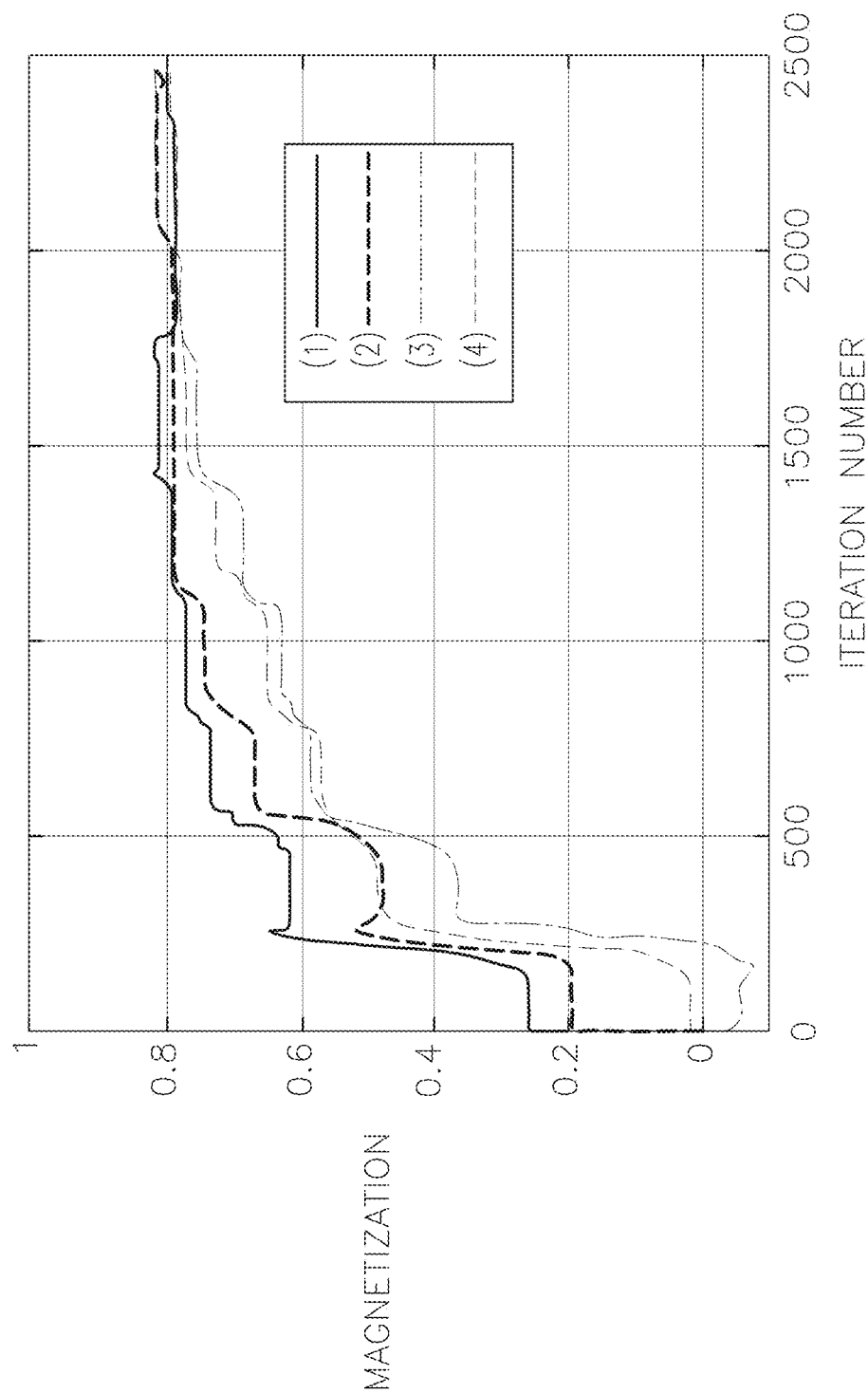
Figure 5D:
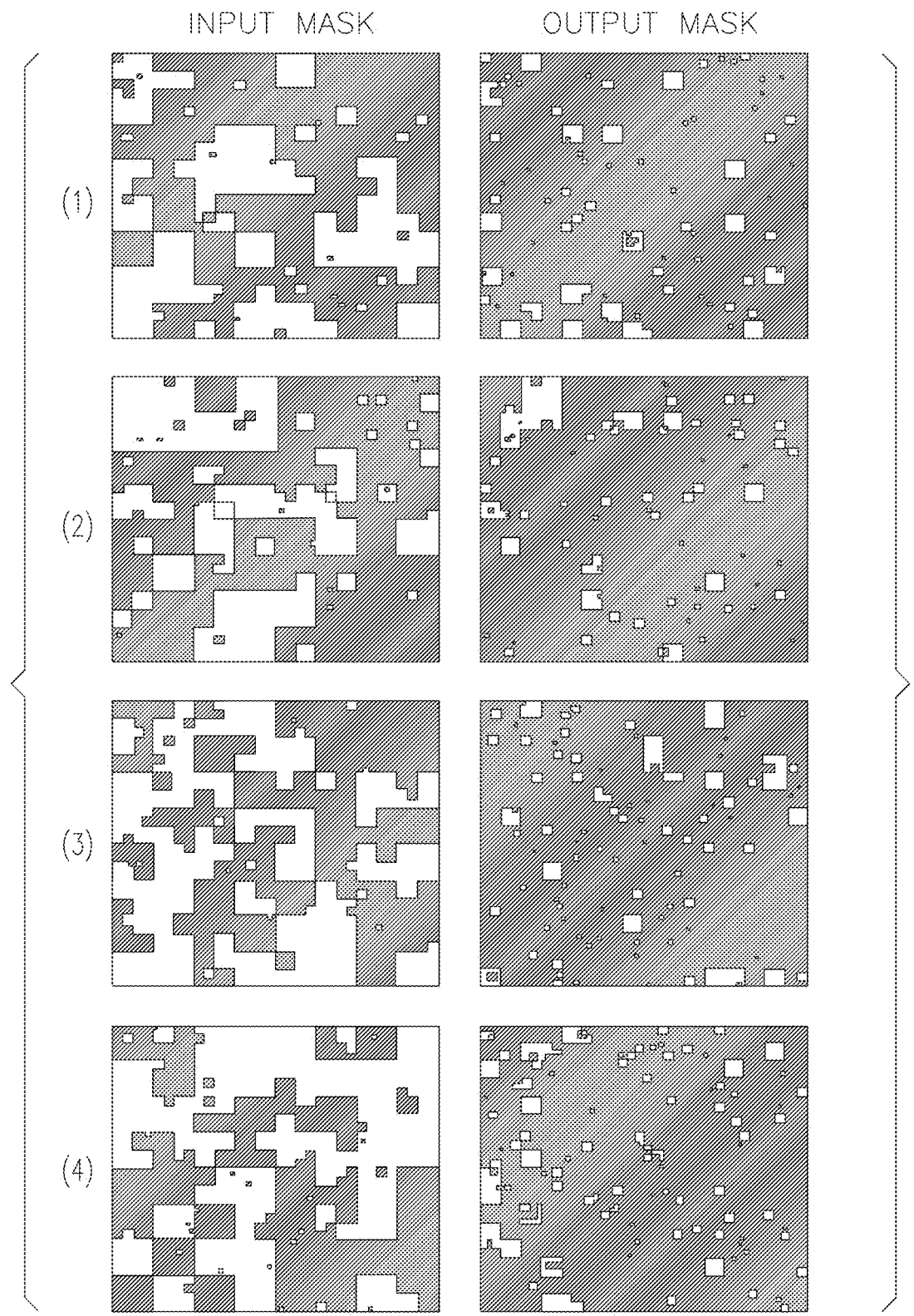
Figure 6A:
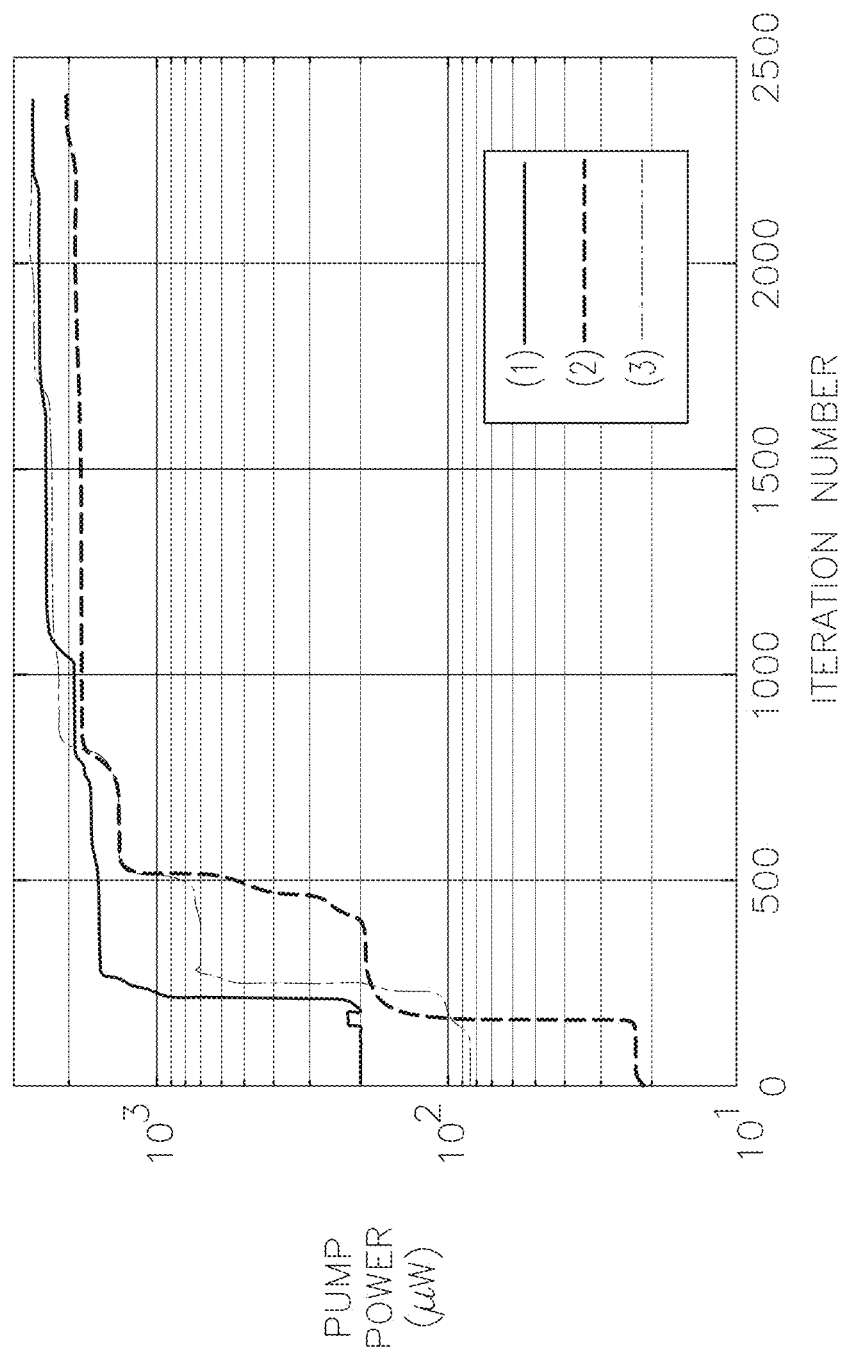
Figure 6B:
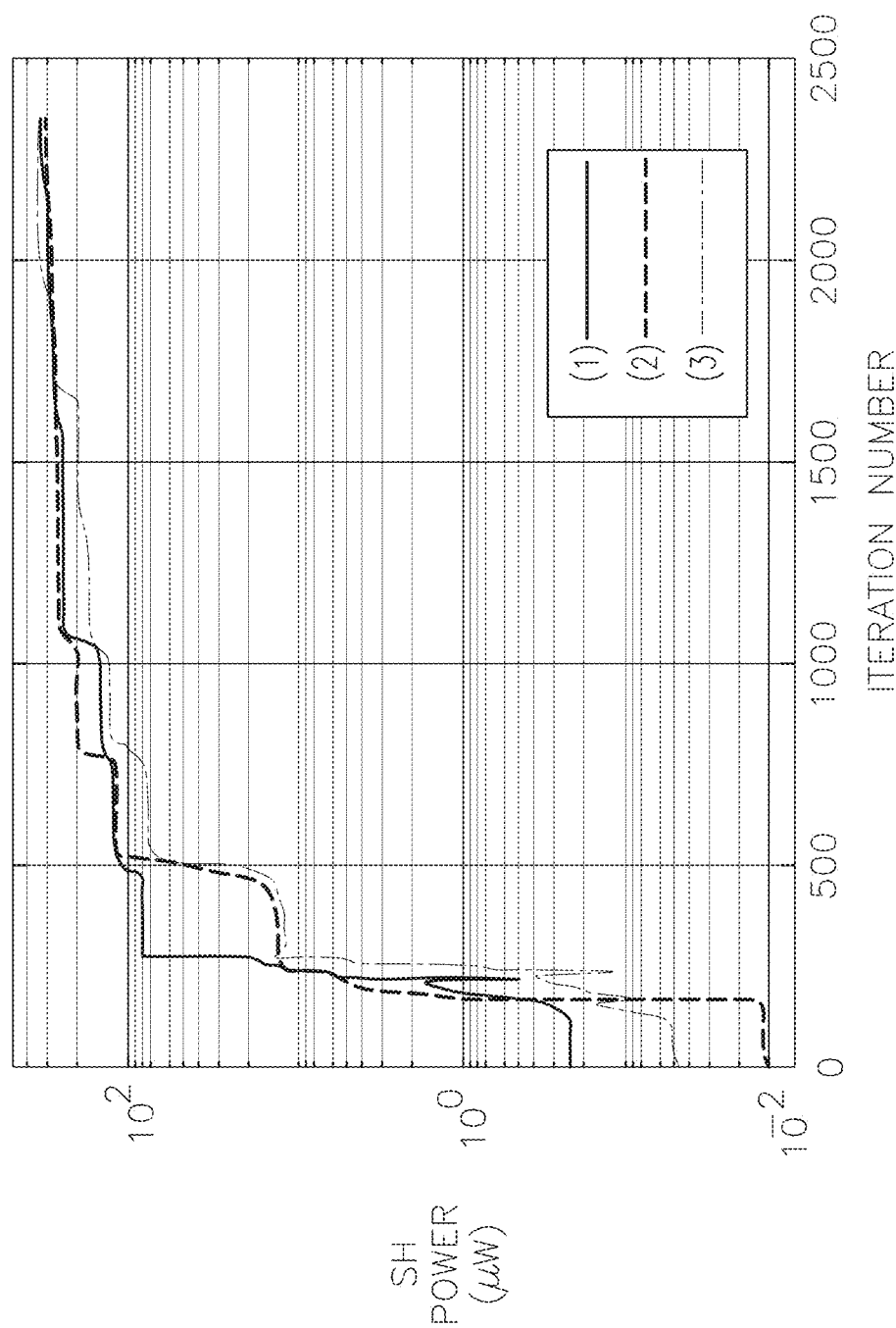
Figure 6C:
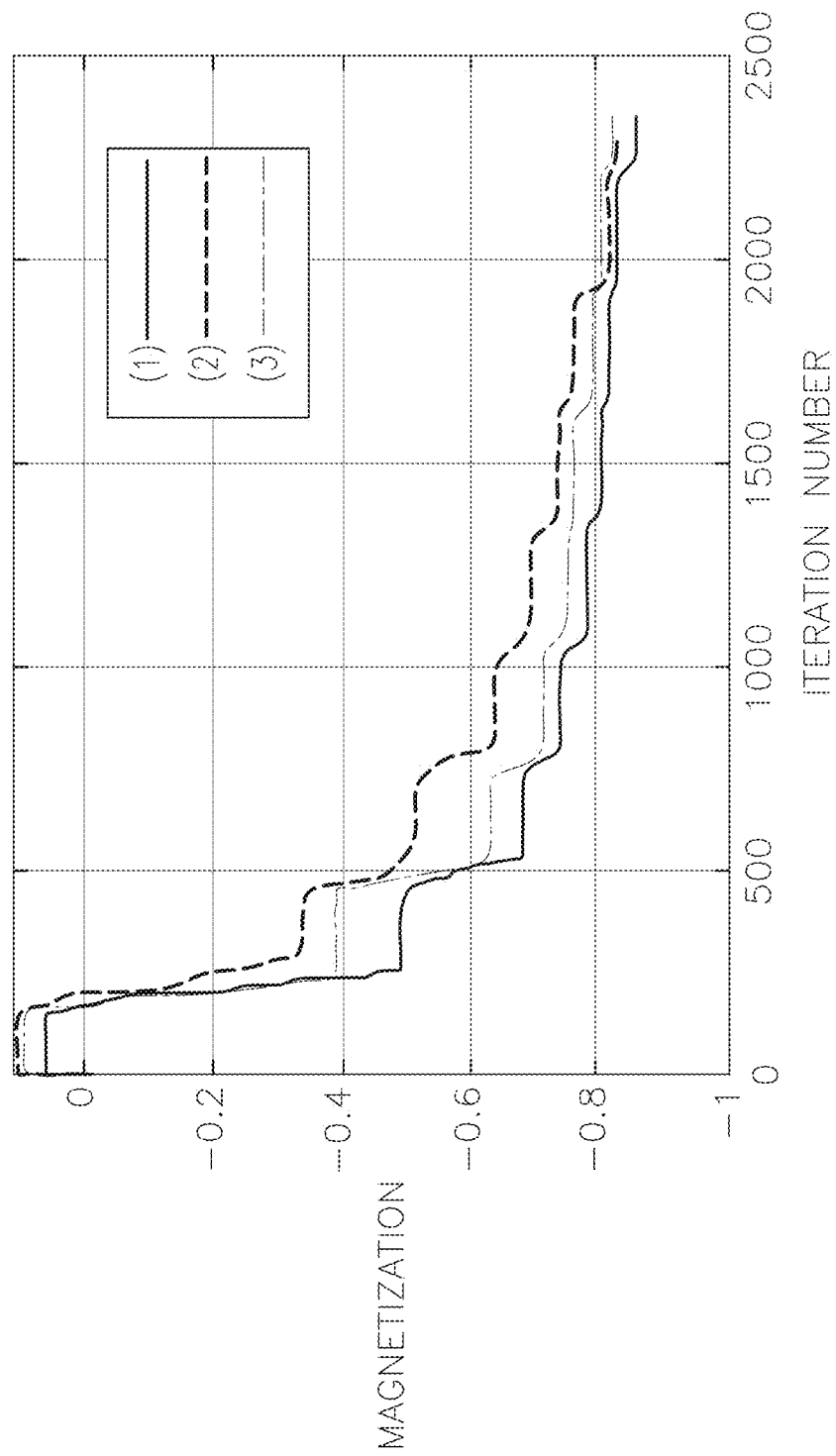
Figure 6D:
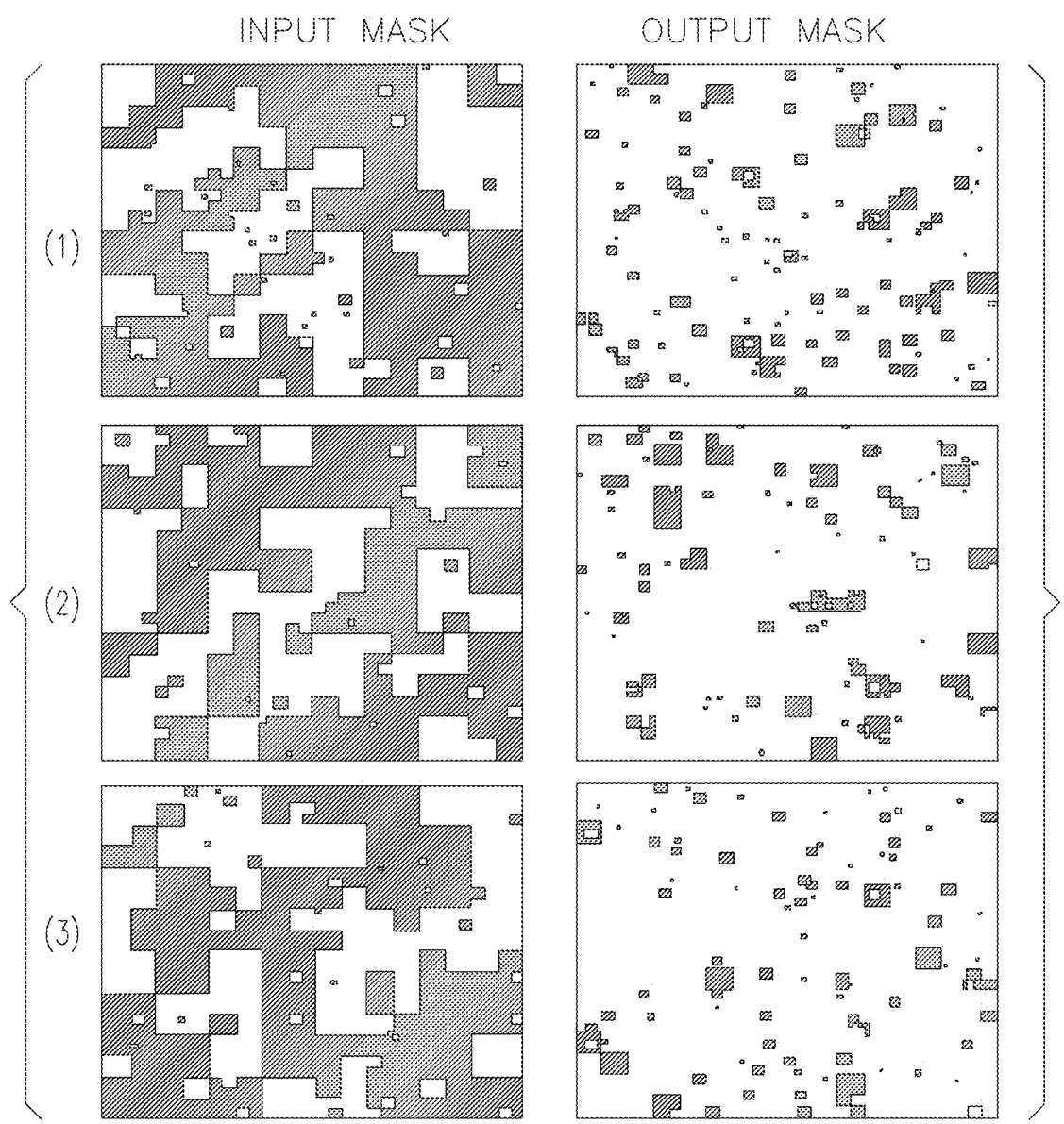

FIG. 5 illustrates the measurement results with α=-1, β=-1, and γ=-1 for optimization of 800×800 spins. The results are shown in log scale of power vs iteration number. FIGS. 5(a) and 5(b) plot the evolution of the SH and pump powers for four different initial phase masks. FIG. 5(c) plots the corresponding magnetization of the system. FIG. 5(d) shows the initial and final phase masks, where the black and white pixels indicate the positive and negative orientated spins, respectively. FIG. 5(d)(1)-(4) represents the evaluation of the SH and pump powers with different input binary spin configurations. In all cases, these results show that the optical powers of the pump and its SH are converging to the optimum value which belongs to the ground state solution of a given ising problem.

FIG. 6 illustrates the results with α=1, β=-0.5, and γ=-1. FIGS. 6(a) and 6(b) show the evolution of the pump and SH powers, respectively, and FIG. 6(c) plots the corresponding magnetization of the system. As the pump and SH powers both increase with the iteration numbers, the magnetization acquires the optimization values in the negative direction. FIG. 6(d) shows the initial and final phase mask patterns, where the black and white regions of the phase mask patterns are the positive and negative orientated spins, respectively. FIG. 6(d)(1)-(3) represents the evaluation of the SH and pump powers with different input binary phase masks. These results show that the optical ising machine can find the approximate ground state solution of a given ising problem.

Figure 7:
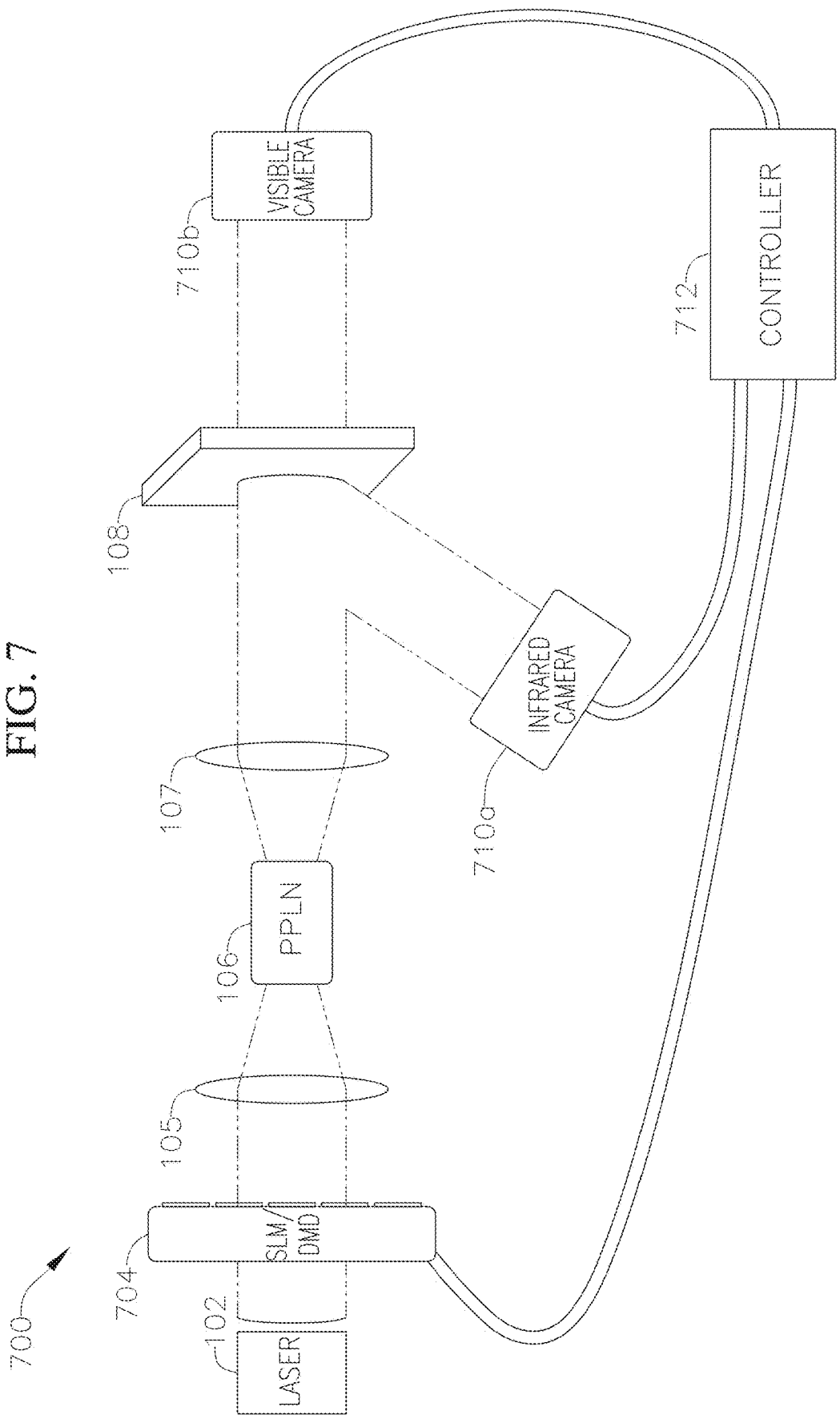
FIG. 7 illustrates an optical computation system utilizing a self-relaxing feedback mechanism, according to some embodiments of the present disclosure.

FIG. 7 illustrates an optical computation system 700 utilizing a self-relaxing feedback mechanism, according to some embodiments of the present disclosure. The system 700 of FIG. 7 is substantially similar to the system 100 of FIG. 1, except for the modulator 704, the cameras 710a and 710b, and the controller 712. As such, for ease of description, components common to both systems 100 and 700 may not be described again herein.

Referring to FIG. 7, according to some embodiments, the gaussian pump laser beam (e.g., at wavelength 1551.5 nm) is incident on the modulator 704, which may be the SLM 104 for modulating the phase of the incident pump beam, or may be a digital micromirror device (DMD) for modulating the intensity of the incident pump beam. The dichroic mirror 108 is installed to split the SH light (e.g., at wavelength 775.75 nm) from the unconverted/remaining pump beam (which may be ab infrared beam). In some embodiments, a first camera 710a (e.g., an infrared camera) captures the intensity of the unconverted/remaining pump beam from the dichroic mirror 108 and a second camera 710b (e.g., a visible light camera) captures the intensity of the SH beam from the dichroic mirror 108. The SH light captured by the second camera 710b can mimic a variety of four-body interaction Hamiltonian. The intensity matrix/pattern as captured by the matrix of pixels at the second camera 710b can be written as:

$$I_4(x,y)=\Sigma_{i=1}^N\Sigma_{j=1}^N\Sigma_{s=1}^N\Sigma_{r=1}^N J'_{ijsr}\sigma_i\sigma_j\sigma_s\sigma_r \qquad \text{Eq (19)}$$

where $J'_{ijsr}$ is the four-body interaction strength. Meanwhile, the unconverted light captured by the first camera 710a can emulate a two-body interaction with the intensity matrix/pattern at the first camera being:

$$I_2(x,y)=\Sigma_{i=1}^N\Sigma_{j=1}^N J'_{ij}\sigma_i\sigma_j. \qquad \text{Eq (20)}$$

The two cameras can work individually or their weighted sum, $\alpha I_2(x,y)+\beta I_4(x,y)$ can be calculated to implement a self-relaxing feedback. The intensity reading at each pixel of the cameras 710a and 710b is a quantized greyscale value. The controller 712 processes the images (or intensity matrices) from the cameras 710a and 710b and controls the modulator (e.g., SLM or DMD) 704 to update a phase or intensity mask at the modulator 704 with new phase or intensity information.

According to some embodiments, the optical computation system 700 incorporates four-body interaction into an optical loop to form a self-relaxing ising machine, which can automatically evolve into a desirable spin configuration. In so doing, the optical computation system 700 utilizes the imaginary time evolution of a quantum system to realize the self-relaxing feedback. To illustrate this, assuming the phase/intensity information/state at the modulator 704 at time t=0 is |ψ(0)⟩ and the Hamiltonian of the whole system 700 is H (including phase/intensity modulation, beam propagation through optics, second harmonic generation, intensity measurement on camera, and any numeric processing of the pixel values), the state at time t is $$|\psi(t)\rangle = e^{-iHt}|\psi(0)\rangle. \quad \text{Eq (21)}$$

From a mathematic point of view, the real-value time t can be replaced by an imagery value −it. Then, the state will be $|\psi(-it)\rangle = e^{-iH(-it)}|\psi(0)\rangle = e^{-Ht}|(0)\rangle$. The initial state $|\psi(0)\rangle$ is a random state, which is a linear combination of different eigenstates, $|\psi(0)\rangle = \Sigma_n c_n |n\rangle$. Therefore, the state at time t may be expressed as $$|\psi(t)\rangle = e^{-Ht}|\psi(0)\rangle = \Sigma_n c_n e^{-Ent}|n\rangle. \quad \text{Eq (21)}$$

It is known that the lower eigenstate has a lower eigenvalue, that is, $E_0 < E_1 < E_2 < \cdots$ Therefore, as time goes on, the ground state $|0\rangle$ will stand out as compared to other states, because that its decay constant $E_0$ contributes to the slowest decay speed. In some embodiments, the quantum state is re-normalized after each step of evolution.

Figure 8:
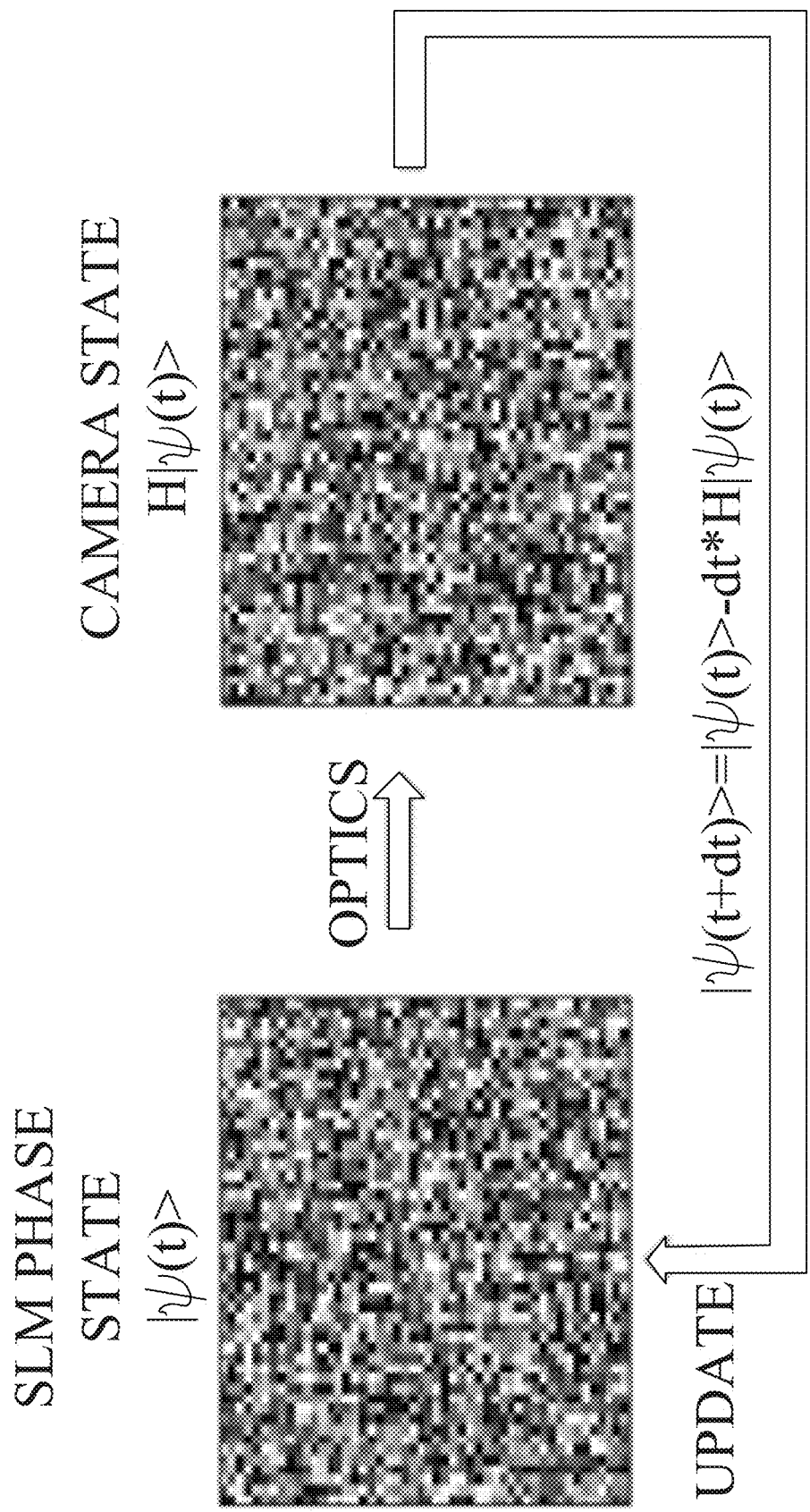
FIG. 8 illustrates an example of state updating by the controller, according to some embodiments of the present disclosure.

FIG. 8 illustrates an example of state updating by the controller 712, according to some embodiments of the present disclosure.

In the example of FIG. 8, the modulator state at time t is $|\psi(t)\rangle$ and the time-step between feedback loops is dt. Therefore, the camera state $I_4(x, y, t)$ can be written as $H|\psi(t)\rangle$. Because the new state at time t+dt is $|\psi(t+dt)\rangle = e^{-Hdt}|\psi(t)\rangle$ and the time-step dt is small enough so that the high order of the exponential expansion can be ignored:

$$e^{-Hdt} = 1 - Hdt + \frac{(-Hdt)^2}{2!} + o(-Hdt) \cong 1 - Hdt. \quad \text{Eq (22)}$$

Then we have:

$$|\psi(t+dt)\rangle \cong (1-Hdt)|\psi(t)\rangle = |(t)\rangle - dtH|\psi(t)\rangle. \quad \text{Eq (22)}$$

Thus, the new modulator state ($|\psi(t+dt)\rangle$) can be represented as the difference between the previous modulator state $|\psi(t)\rangle$ and dt times camera state ($H|\psi(t)\rangle$).

At startup, the controller 712 chooses a random state $|\psi_0\rangle$ as an initial modulator phase state. After passing through the nonlinear crystal, the upconverted light (i.e., the SH beam) and the unconverted light (i.e., the remaining pump beam) are detected by the cameras 710a and 710b. Depending on the problem being emulated by the optical computation system 700, the controller 712 calculates the total camera state $|\phi_0\rangle$ as the intensity matrix from one of the first and second cameras 710a and 710b (i.e., $I_2(x,y)$ or $I_4(x,y)$), or a weighted sum of the intensity matrices (i.e., $\alpha I_2(x,y) + \beta I_4(x,y)$).

According to some embodiments, the controller 712 determines updates the modulator phase state by calculating a new state as $|\psi_1\rangle = |\psi_0\rangle - \Delta t |\phi_0\rangle$, and normalizing it by the initial state $$|\psi'_1\rangle = |\psi_1\rangle * \frac{||\psi_0\rangle|^2}{||\psi_1\rangle|^2}.$$

Thus the controller 712 determines the new modulator state phase of the next loop iteration as:

$$|\psi'_1\rangle = (|\psi_0\rangle - \Delta t |\phi_0\rangle) * \frac{||\psi_0\rangle|^2}{||\psi_1\rangle|^2}. \quad \text{Eq (23)}$$

Here, the time step $\Delta t$ of the feedback loop is small enough to reduce or minimize numeric error. In some examples, the feedback step size $\Delta t$ represents the periodicity of the pulse train of the light source 102. In some embodiments, the controller 712 adaptively adjusts $\Delta t$ to enable self-relaxation, since the dynamics of the optical computation system 700 may be accelerated or made slower. The step size may be chosen such that the approximation made in Eq. (22) is valid.

According to some embodiments, the optical computation system can automatically align its spins to maximize or minimize its interaction energy.

Figure 9A:
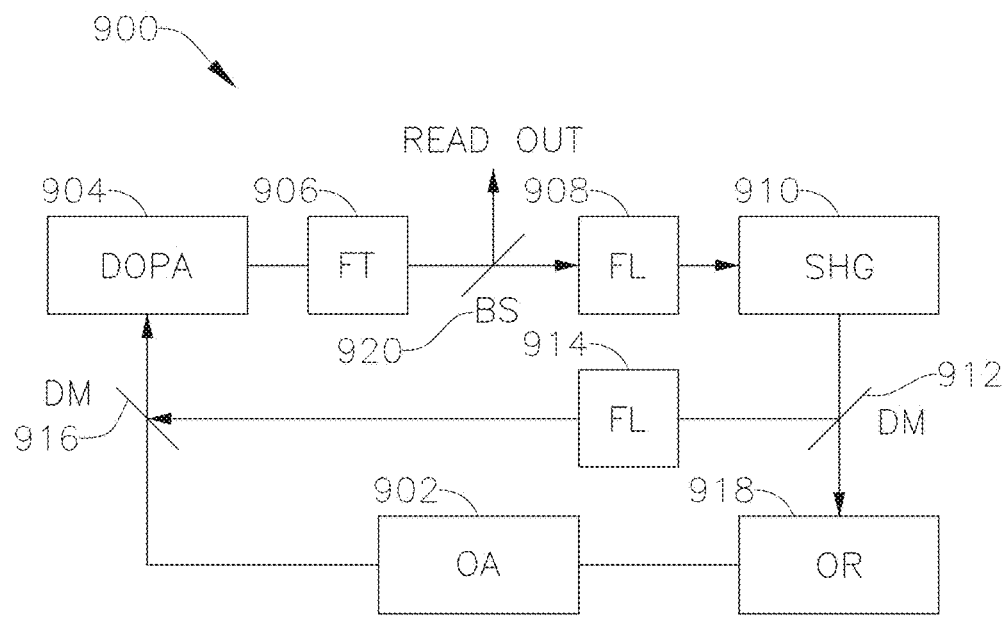
FIGS. 9A-9B and 10 illustrate optical computation systems utilizing optical feedback, according to some embodiments of the present disclosure.

FIG. 9A illustrates an optical computation system 900 utilizing optical feedback, according to some embodiments of the present disclosure.

In the example of FIG. 9, an optical loop is used to provide the feedback where only the spin configuration with the highest four-body interaction energy will meet the optical oscillation condition and builds up. The optical loop begins with an optical amplifier (OA) 902 to generate a weak pump beam at the second harmonic wavelength with a flat phase front to drive a degenerate optical parametric amplifier (DOPA) 904. The DOPA 904 may be a phase matched or quasi-phase matched optical medium of second-order nonlinearity, such as a beta barium borate (BBO) crystal, a potassium titanyl phosphate (KTP) crystal or a periodically poled lithium niobate (PPLN) crystal. In DOPA 904, the pump beam generates and amplifiers a signal wave at twice its wavelength. The pump beam is wide so that there is little diffraction inside the DOPA 904, and many signal wavelets, each representing a spin, are generated/amplified independently across the transverse section of the pump beam.

After the DOPA 904, the pump light is filtered/removed by using a filter 906, which could be a bandpass filter, an edge filter, a dichroic mirror, or the like, and the signal is focused into a second-harmonic generation (SHG) device 910 using a first fourier lens 908. The SHG device 910 could be a phase matched or quasi-phase matched optical medium of second-order nonlinearity, such as a BBO crystal, a KTP crystal, or a PPLN crystal. During SH generation, the effective interactions between the spins are realized to create second-harmonic light. At the output, the remaining pump signal and the generated SH light are separate at a first dual-band reflector (e.g., a first dichroic mirror (DM) or optical filter) 912 or any other optical device to that effect. The remaining pump signal is then passed through a second fourier lens 914 to undo the focusing. It is then directed to the DOPA 904 via a second dual-band reflector (e.g., a second dichroic mirror or optical filter) 916. The SH light, on the other hand, is collected by an optical receiver (OR) 918, which may be an optical fiber or a collimated beam by free space optics. The SH light is then amplified by the OA 902, and is combined with the remaining pump signal and directed to the DOPA 904 as the new pump. This loop will run many times until a stable outcome is created, upon which the signal will be read via a beam splitter (BS) 920 to measure its spins across the transverse profile. Here, as the signal continuously traverses the optical computing system, an optical gain of the optical amplifier is increased until optical parametric oscillation occurs.

In this optical configuration, the DOPA 904 generates and amplifies the signal wavelets across the cross-section of the pump beam through degenerate optical parametric amplification. Because the pump beam has a flat phase front, the generated signal wavelet at each spatial grid (i.e., pixel) can have the same phase with the pump light, or the opposite. This mechanism defines the discrete phase of the signal wavelets, so that each of them can represent spin up (0 phase relative to the pump) or spin down (pi-phase relative to the pump). Initially, there is no signal, and the DOPA 904 can be understood as a quantum process where the vacuum noises are amplified. The vacuum noises contain all the possible spin configurations. The amplified vacuum noises will be filtered, after which the pump will be dumped. Afterwards, they will be focused into a second-order nonlinear crystal for SH generation. The amount of second-harmonic light that can be created during the SH generation is dependent on the spin configuration. In fact, its intensity can be written as the energy of the four-body interaction of the spins. The resulting second-harmonic signal is then amplified by the OA 902 to create pump for the DOPA 904, to amplify the signal during the next round. The loop will continuously run.

In this way, the optical computation system 900 effectively realizes an optical parametric oscillator (OPO), with the distinction that here, the optical gain is realized through intermediate steps of SH generation and optical amplification. When in operation, the optical gain of the OA 902 may be slowly increased until the first optical parametric oscillation signal appears, i.e., until a strong and stable signal can be read out. When this happens, the signal will be prepared in the desirable spin configuration to maximize the four-body interaction. This is because other configurations will produce less second-harmonic light, thus the effective OPO gain is less. Since the OPO requires that the optical gain during each optical loop be larger than the net loss, by slowly increasing the OA gain, only the first OPO signal will appear when the optical gain for the desirable spin configuration just exceeds the net loss. All other spin configurations will lead to more loss than gain, thus no optical oscillation is possible for these other spin configurations. Here, before OPO occurs, the DOPA process can be understood as the amplification of vacuum noises, in all possible spin configurations.

To further ensure that only one spin configuration exists, the OA can be set to operate under an optical power saturation limit, i.e., the OA will stop amplifying if the output power reaches the limit. In this way, after the OPO is established for the desirable spin configuration, both the signal and pump power increases to saturate the OA, so that the effective gain for other spin configurations is reduced.

In some embodiments, the spin configuration of the signal can be read out by first interfering it with a local-oscillator with a flat phase front and then measuring it using a CCD camera. In some embodiments, the signal can be passed through linear optical elements, such as a fourier lens, so that its spin configuration can be measured on different mode basis.

In some embodiments, the optical loop is stabilized against any thermal, mechanical, or other drifts. The stabilization can be realized through a feedback control mechanism.

Figure 9B:
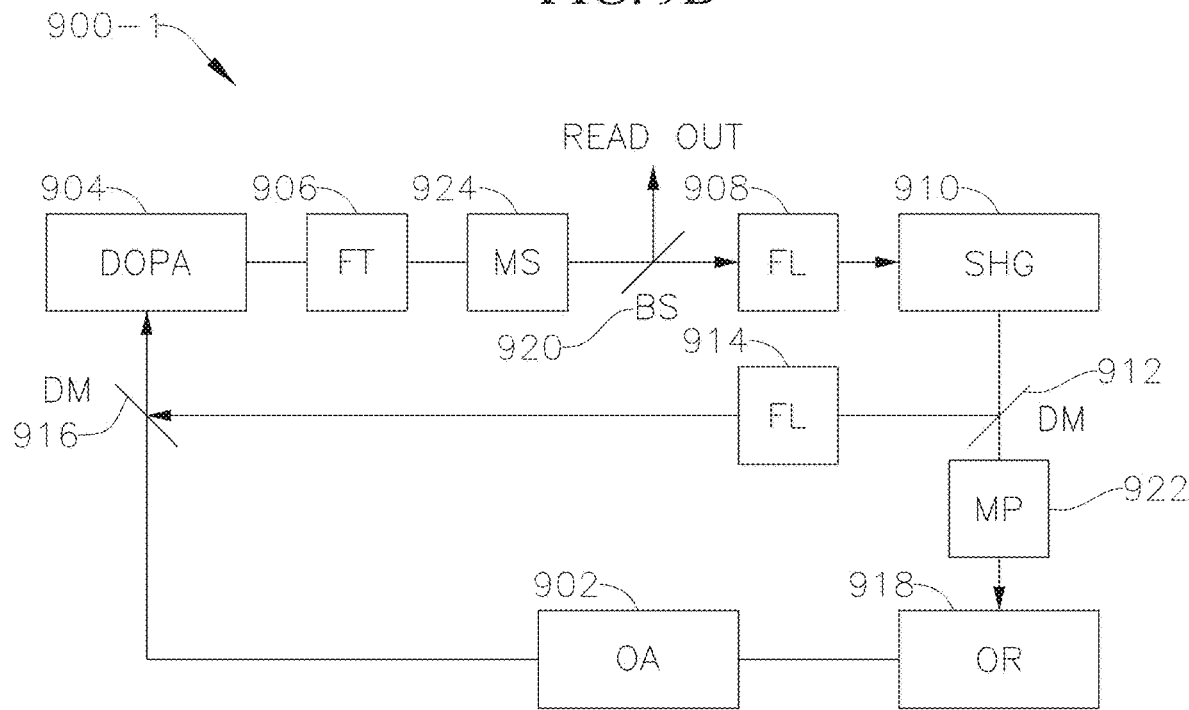

According to some embodiments, the effective interaction Hamiltonian is modified to model practical problems of interest. This can be realized by applying optical modulations to the signal before the SHG, and/or applying modulations to the generated second-harmonic light before they are collected by OR. This option is depicted in FIG. 9B. In the optical computation system 900-1, the modulations of the optical modulator 922 for the pump (MP) and the optical modulator 924 for the signal (MS) can be in the form of phase modulation, amplitude modulation, or both. The modulation can be realized using spatial light modulators, digital micromirror devices, or a combination of the two. For the pump light, the modulation can be effectively realized by other means, such as coupling it into a single mode fiber.

FIGS. 9A and 9B specifically describe how to maximize the four-body interaction by optimizing the spin configurations. Similar schemes can be developed to minimize the four-body interaction by making the pump power for DOPA inversely proportional to the detected power of the second-harmonic light.

Besides maximizing or minimizing the four-body interaction, the same principle can be used to find the spin configurations that maximizes or minimizes the two-body interaction.

Figure 10:
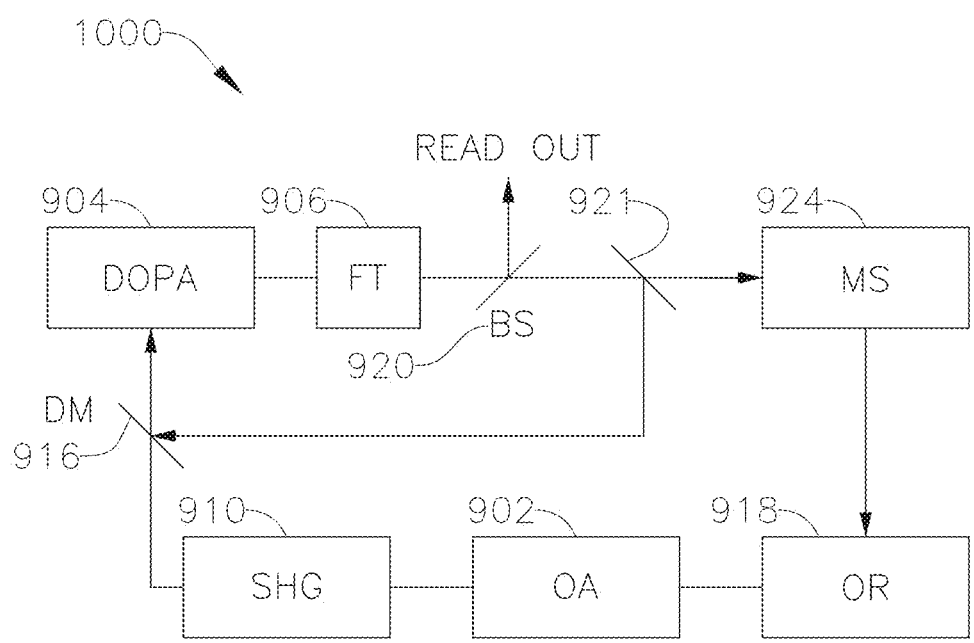

FIG. 10 presents such an example, which follows the basic structure of FIG. 9A but with the signal partially split and directly detected without passing through the SHG 910. To modulate the effective two body interaction Hamiltonian, the signal is modulated by the optical modulator (MS) 924 before being detected. In some embodiments, this modulation is not necessary and may be circumvented. The detected signal creates a pump with a flat phase front to drive the DOPA 904. In some embodiments, this is realized by first amplifying the signal power and then frequency doubling it, as shown in FIG. 9B. In some embodiment, the signal is photo detected, and the resulting electronic signals is used to control the pump power to drive the DOPA, using either an adjustable gain laser source or a fixed gain laser source but with an adjustable beam splitter or variable power attenuator.

As shown in FIG. 10, according to some embodiments, the optical computation system 1000 includes an optical amplifier (OA) 902 configured to generate an amplified signal with a flat phase front; a nonlinear optical device (SHG) 910 configured to receive the amplified signal and to generate a pump beam through second-harmonic generation based on the amplified signal; a degenerate optical parametric amplifier (DOPA) 904 configured to generate a signal of double wavelength in small wavelets based on the pump beam; an optical filter (FT) 906 configured to filter the pump beam from the signal; a first optical beam splitter (BS) 920 configured to read out a fraction of the signal; a second optical beam splitter 921 configured to direct a first portion of the signal to an optical modulator (MS) 924 for modulation of the portion of the signal and to direct a second portion of the signal to a dichroic mirror (DM) 916; and an optical receiver (OR) 918 configured to couple the modulated first portion of the signal into the optical amplifier 902 to generate the amplified signal. Here, the dichroic mirror 916 is configured to combine the second portion of the signal with the pump beam into the degenerate optical parametric amplifier. According to some examples, the optical modulator 924 may be a spatial light modulator or a digital micromirror device, and the nonlinear optical device 910 may be a nonlinear optical crystal or an optical waveguide.

In some embodiments, the schemes for the two-body and four-body interaction can be combined to find the spin configurations that are maximizing or minimizing one interaction while also maximizing or minimizing the other, or maximizing or minimizing a weighted sum of the two.

While the optical computation systems disclosed herein support only two- and four-body interactions, other processes of nonlinear optics, such as sum-frequency, four-wave mixing, and high-order harmonic generation, can be employed to realize even higher-order interactions, whose computational complexity and intensity could quickly grow beyond the capability of existing computing platforms.

Example of Mapping an NP-Hard Problem into the Ising Model

Many NP-hard problems can be sketched into the graphs and these graphs can be mapped into an ising model. Below is the example of mapping a partitioning graph problem into ising problem.

Considering a simple undirected graph G=(V,E) which has N number of nodes with V vertices and E number of edges, the problem may be to split the graph into "m" number of subgraphs by partitioning its set of nodes. There are $m^{(N-1)}-1$ number of ways to divide the graph into subgraphs with N number of nodes. To optimally compute the partitioning of the vertices, $V=V_0 \cup V_1 \cup V_2 \ldots \cup V_{m-1}$, the following conditions need to be satisfied:

1) $\{V_i\}$ are disjoint→$V_i \cap V_j = \phi$
2) All $\{V_i\}$ are approximately balanced→$|V_i| \sim |V_j|$
3) Number of cut edges should be minimum/maximum i.e. $|E_{cut}|_{Min/Max}=\{(u,v)|u \in V_i, v \in V_j, i \neq j\}$.

Figure 11B:
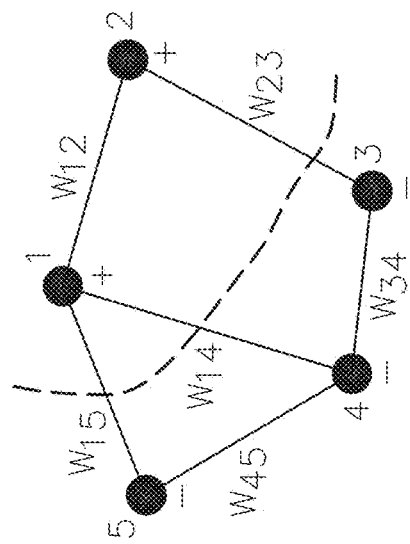
FIGS. 11(a)-11(c) illustrate a graph being partitioned in an ising model, according to some embodiments of the present disclosure.
Figure 11C:
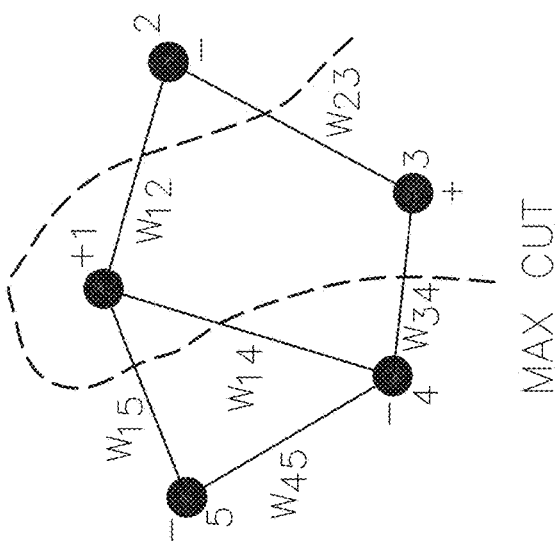
Figure 11A:
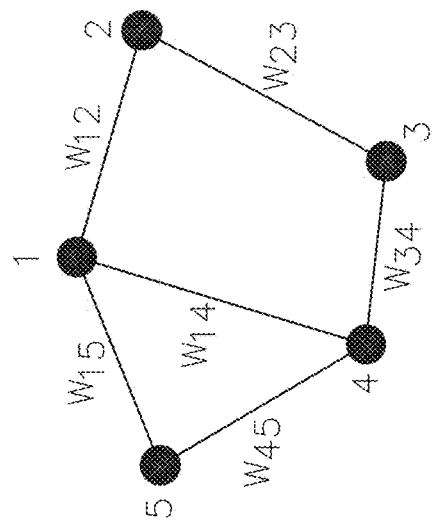

Finding an exact solution of the graph partitioning for large number of nodes is an NP combinatorial optimization problem. For simplicity, one can consider a graph with 5 number of nodes connected with 6 edges carry weight $w_{ij}$, where i≠j are the nodes and $w_{ij}=w_{ji}>0$ as shown in FIG. 11(a). There are a number of ways to cut this graph into two subgraphs to find a cut through maximum number of edges. Two of them are shown in FIGS. 11(b) and 11(c). As the graph is split, the values $S_i=\{+,-\}$ may be assigned to the nodes of the separated subgraphs. The cost function of the cut can be represented as $$C = \sum_{ij} \frac{1 - S_i S_j}{2} w_{ij};$$

where the value of $$\left(\frac{1 - S_i S_j}{2}\right)$$

is zero if i,j in the same subgraph otherwise 1. The cost function can be rewritten as $$C = \Sigma_{i<j} w_{ij} - \Sigma_{i<j} S_i S_j w_{ij}. \qquad \text{Eq (24)}$$

The Max cut solution may be found by minimizing the second term of the cost function. This shows that the minimization of the cost function is equivalent to the minimization of the energy of the ising Hamiltonian.

Ising models with pairwise and higher-order interactions are active area of research in statistical physics and machine learning. The nonlinear optical system, according to some embodiments of the present disclosure, with large number of nodes and all-to-all connection is a viable solution for solve these problems much faster.

The operations performed by the constituent components of the optical computation system of the present disclosure, such as the controller, may be performed by a "processing circuit" or "processor" that may include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

Further, the use of "may" when describing embodiments of the inventive concept refers to "one or more embodiments of the inventive concept." Also, the term "exemplary" is intended to refer to an example or illustration.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An optical computing system comprising: an optical amplifier configured to generate a pump beam with a flat phase front; a degenerate optical parametric amplifier configured to generate a signal of double wavelength in small wavelets based on the pump beam; an optical filter configured to filter the pump beam from the signal; an optical beam splitter configured to read out a fraction of the signal; an nonlinear optical crystal configured to generate second-harmonic light based on the signal; a first dual-band reflector configured to separate the signal and the second-harmonic light; an optical receiver configured to couple the second-harmonic light into the optical amplifier; and a second dual-band reflector configured to combine the signal and second-harmonic light into the degenerate optical parametric amplifier.

2. The optical computing system in claim 1, further comprising: a first fourier lens configured to focus the signal into the nonlinear optical crystal for generation of second-harmonic light; and a second fourier lens between the first and second dual-band reflectors and configured to defocus the signal.

3. The optical computing system in claim 1, wherein each of the first and second dual-band reflectors comprises a dichroic mirror or an optical filter.

4. The optical computing system in claim 1, wherein, as the signal continuously traverses the optical computing system, an optical gain of the optical amplifier is increased until optical parametric oscillation occurs.

5. The optical computing system in claim 4, further comprising a second optical modulator between the nonlinear optical crystal and the optical receiver and configured to modulate the second-harmonic light to change an effective four-body interaction Hamiltonian of the optical computing system.

6. The optical computing system in claim 1, further comprising a first optical modulator between the degenerate optical parametric amplifier and the nonlinear optical crystal and configured to modulate the signal prior to the signal reaching the nonlinear optical crystal to change an effective four-body interaction Hamiltonian of the optical computing system.

7. The optical computing system of claim 1, wherein said optical filter comprises a nonlinear optical crystal or an optical waveguide.

8. The optical computing system of claim 1, wherein said optical filter comprises a periodic-poled lithium niobate crystal.

* * * * *